(12) United States Patent
Yokoyama

(10) Patent No.: US 7,464,170 B2
(45) Date of Patent: Dec. 9, 2008

(54) CONTENT DELIVERY SERVER AND TERMINAL APPARATUS

(75) Inventor: Toru Yokoyama, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 879 days.

(21) Appl. No.: 10/641,060

(22) Filed: Aug. 15, 2003

(65) Prior Publication Data

US 2004/0243715 A1   Dec. 2, 2004

(30) Foreign Application Priority Data

May 29, 2003   (JP) ............................ 2003-151791

(51) Int. Cl.
   *G06F 15/16*   (2006.01)
   *H04L 12/28*   (2006.01)
(52) U.S. Cl. .................. 709/231; 709/227; 370/351
(58) Field of Classification Search ......... 709/201–203, 709/216–219, 223–232; 370/329–331, 351–355
   See application file for complete search history.

(56) References Cited

U.S. PATENT DOCUMENTS

| 6,065,050 | A  |   | 5/2000 | DeMoney |
| 6,377,930 | B1 | * | 4/2002 | Chen et al. ............... 704/503 |
| 6,378,035 | B1 | * | 4/2002 | Parry et al. ............... 711/110 |
| 6,539,004 | B1 |   | 3/2003 | Sawyer |

| 2002/0085516 | A1 | * | 7/2002 | Bridgelall ............... 370/329 |
| 2003/0078045 | A1 |   | 6/2003 | Norstrom et al. |

FOREIGN PATENT DOCUMENTS

| JP | 2001-101650 | 4/2000 |
| JP | 2000-138716 | 5/2000 |
| JP | 2002-64562 | 2/2002 |
| JP | 2002-176432 | 6/2002 |
| WO | WO 02/43348 | 5/2002 |

OTHER PUBLICATIONS

Office Action dated Feb. 12, 2008 to corresponding JP 2003-151791.

* cited by examiner

*Primary Examiner*—Yasin M Barqadle
(74) *Attorney, Agent, or Firm*—Mattingly, Stanger, Malur & Brundidge, P.C.

(57) ABSTRACT

During the reception of a content delivery service, if the service is continued by switching a communication path, a temporary interruption occurs upon the switching of a session. There are cases where the same service cannot be continued if the communication speed of the communication path prior to switching is greatly different from that of a communication path after switching. Sessions for delivering two contents each encoded from the same source data, having different bit rates, and temporally synchronized with each other are established simultaneously with respect to a client terminal. The sessions are switched at the client terminal based on information on the respective times of content data from the two sessions such that a temporal continuation is provided therebetween.

5 Claims, 24 Drawing Sheets

FIG.4A http://server/contentset.info — 401

FIG.4B

| http://server/contentset.info 403 | |
|---|---|
| URL http://server/content.mp4?br=512 | |
| FILE TYPE | MP4 |
| TOTAL TIME | 1200sec |
| AVERAGE RATE | 512kbps |
| MEDIA TYPE | Video |
| CODEC TYPE | M4V SP@L3 |
| AVERAGE RATE | 384kbps |
| IMAGE WIDTH | 320 |
| IMAGE HEIGHT | 240 |
| FRAME RATE | 10fps |
| MEDIA TYPE | Audio |
| CODEC TYPE | MP3 |
| AVERAGE RATE | 128kbps |
| NUMBER OF CHANNELS | 2 |

| 404 | |
|---|---|
| URL http://server/content.mp4?br=256 | |
| FILE TYPE | MP4 |
| TOTAL TIME | 1200sec |
| AVERAGE RATE | 256kbps |
| MEDIA TYPE | Video |
| CODEC TYPE | M4V SP@L3 |
| AVERAGE RATE | 128kbps |
| IMAGE WIDTH | 176 |
| IMAGE HEIGHT | 144 |
| FRAME RATE | 10fps |
| MEDIA TYPE | Audio |
| CODEC TYPE | MP3 |
| AVERAGE RATE | 128kbps |
| NUMBER OF CHANNELS | 2 |

FIG.5

| | | |
|---|---|---|
| TYPE OF COMMUNICATION PATH | WIRELESS LAN | ⎫ |
| MAXIMUM THROUGHPUT | 11Mbps | ⎬ 501 |
| IP ADDRESS | xxx.xxx.xxx.xxx | |
| PRIORITY | 15 | ⎭ |
| TYPE OF COMMUNICATION PATH | 1xEV-DO | ⎫ |
| MAXIMUM THROUGHPUT | 1.5Mbps | ⎬ 502 |
| IP ADDRESS | xxx.xxx.xxx.xxx | |
| PRIORITY | 14 | ⎭ |
| SUPPORTED CODEC | MP4,M4V-SP,MP3,WMV,... | ⎫ |
| MAXIMUM RENDERING SIZE | 320x240 | ⎬ 503 |
| CPU CLOCK | 500MHz | |
| MEMORY CAPACITY | 128MB | ⎭ |

| SESSION MANAGEMENT TABLE(PROXY SERVER) |
|---|
| SESSION INFORMATION |
|    CONTENT ID |
|    CACHE INFORMATION |
|       TIME RANGE OF CONTENT IN CACHE<br>      DATA SIZE IN CACHE<br>      TIME RANGE OF CONTENT ALREADY TRANSMITTED TO CLIENT |
|    CLIENT COMMUNICATION INFORMATION |
|       IP ADDRESS , PORT No. , COMMUNICATION PROTOCOL<br>      TIME OF LATEST CONTENT RECEIVED BY CLIENT<br>      RECEPTION THROUGHPUT OF CLIENT AND ITS HISTORY |
|    COMMUNICATION PATH INFORMATION |
|       IP ADDRESS OF CLIENT , TYPE OF COMMUNICATION PATH , MAXIMUM THROUGHPUT<br>      PRIORITY , CURRENT THROUGHPUT , AND ITS HISTORY |
|    CONTENT SET INFORMATION |
|       CONTENT ID<br>      CONTENT URL<br>      TOTAL TIME , AVERAGE CONTENT RATE<br>      FILE TYPE , MEDIA INFORMATION |

| SESSION MANAGEMENT TABLE(CLIENT TERMINAL) |
|---|
| SESSION INFORMATION |
|    ID OF CONTENT UNDER RECEPTION |
|    DECODE BUFFER INFORMATION |
|       TIME RANGE OF CONTENT DATA IN DECODE BUFFER<br>      DATA SIZE IN DECODE BUFFER<br>      RAP TIME |
|    RECEPTION INFORMATION |
|       IP ADDRESS OF PROXY SERVER , PORT No. , COMMUNICATION PROTOCOL<br>      RECEPTION THROUGHPUT AND ITS HISTORY |
|    COMMUNICATION PATH INFORMATION |
|       IP ADDRESS OF PROXY SERVER , TYPE OF COMMUNICATION PATH , MAXIMUM THROUGHPUT<br>      PRIORITY , CURRENT THROUGHPUT , AND ITS HISTORY |
|    CONTENT SET INFORMATION |
|       CONTENT ID<br>      CONTENT URL<br>      TOTAL TIME , AVERAGE CONTENT RATE<br>      FILE TYPE , MEDIA INFORMATION |

START TIME OF REPORT RANGE (RSSC)
END TIME OF REPORT RANGE (RESC)
OLDEST CONTENT TIME IN REPORT RANGE (ORCC)
LATEST CONTENT TIME IN REPORT RANGE (LRCC)
NUMBER OF RECEIVED BYTES IN REPORT RANGE (RB)
SUMMATION OF ZERO RECEIVED TIME IN REPORT RANGE (ZSC)
SYSTEM TIME OF LATEST DATA RECEPTION (LRSC)
TIME OF CONTENT REMAINING IN DECODE BUFFER(CONTENT TIME) (DRCC)
PACKET LOSS RATE IN REPORT RANGE (PLR)

(EXAMPLE OF BURST DATA TRANSMISSION)

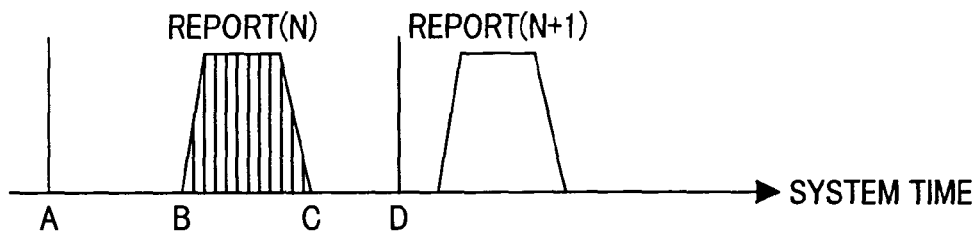

ZSC(N)=AB+CD
RESC(N)=D
RSSC(N)=A
▯▯▯▯▯ =RB(N)

AVERAGE THROUGHPUT $ATHR(N) = \dfrac{RB(N)}{RESC(N) - RSSC(N) - ZSC(N)}$

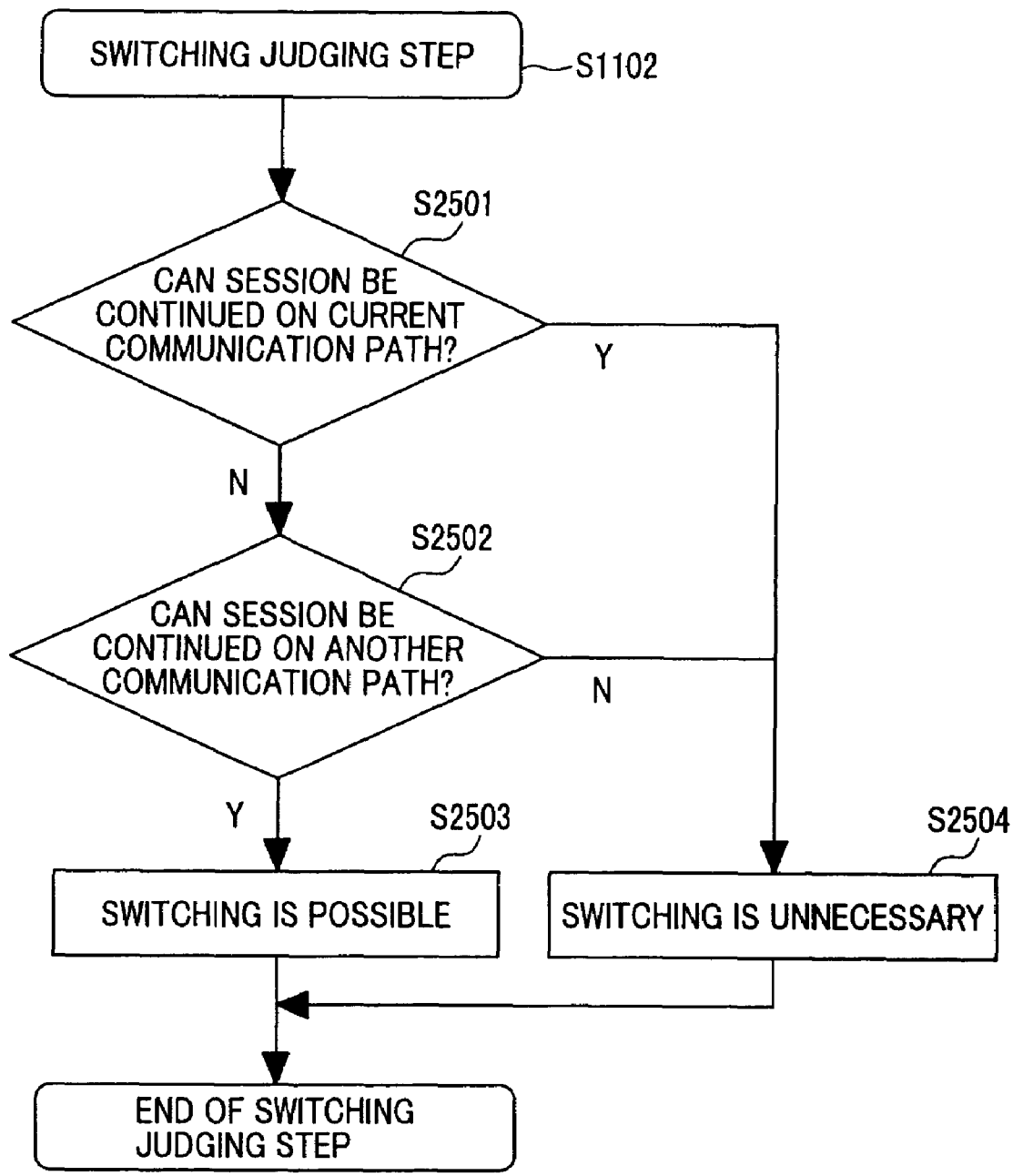

CONTENT DELIVERY SERVER AND TERMINAL APPARATUS

BACKGROUND OF THE INVENTION

1. Field of the Invention

The present invention relates to a content delivery system composed of a communication terminal apparatus having means for reception via a plurality of communication paths and of a communication apparatus for providing a content delivery service to the communication terminal apparatus and to a terminal apparatus.

2. Description of Related Art

With the diversification of life styles and working patterns, demand has grown for a communication service which is available at any time and anywhere through connection to the Internet using a mobile terminal such as a mobile phone, a PDA, or a note-type personal computer. Owing to the recent advances in mobile communication technology, a plurality of mobile communication networks including Wireless LAN, W-CDMA, cdma 2000, and Bluetooth are usable at present. A mobile terminal is capable of connection to each of the communication networks by using a communication adaptor supported by the corresponding one of the communication networks. The mounting of a plurality of communication adaptors on one mobile terminal has made it possible to select an optimum communication network depending on the speed of received data or a communication situation at the mobile terminal and dynamically switch the communication network.

In the case of dynamically switching the communication path, while the mobile terminal is receiving a content delivery service through connection to the server, and continuing the content delivery service, it is typical for a proxy apparatus or an agent present on a communication path to constantly preserve session information for the content delivery service and continue the delivery service by using the session information in the content delivery service on a communication path after switching.

The session used herein indicates a communication flow between a transmitting apparatus providing a given communication service and a receiving apparatus and a set of sequential processes executed at each of the transmitting and receiving apparatus to provide the communication service. The session information is general information on a session for providing the service. As examples of the session information, there can be listed, e.g., the IP addresses and port numbers of server/client terminals, a communication protocol, a session start time, a time elapsed from the beginning of the service, a service name, and the name of an application in use.

For the continuation of a delivery service on the switching of a communication path, there has been proposed a method in which session managing means switches the condition of a session in response to a request from a mobile terminal, while delivered data is received by a user., and thereby switches the terminal (see, e.g., Patent Document 1) and a method which exchanges session information for a delivery service between proxys in response to a request from a session managing unit and thereby flexibly performs the switching of a communication path at a mobile terminal (see, e.g., Patent Document 2).

[Patent Document 1] JP-A No. 176432/2002
[Patent Document 2] JP-A No. 64562/2002

However, each of the foregoing conventional methods for switching a delivery service upon the switching of a communication path temporarily intermits a session at a mobile terminal, switches the communication path, and then resumes the session. As a result, a problem has occurred in a delivery service in which the continuity of received data greatly affects the quality of the service that a temporarily interrupted session as described above causes user discomfort. Another problem is that, if the characteristic of a communication path, such as a communication speed, prior to switching is different from that of a communication path after switching, it is difficult to continue the same service.

Specifically, the foregoing technology disclosed in Patent Document 1 cannot provide the delivery service without temporary interruption at the same terminal. The technology disclosed in Patent Document 2 also encounters the interruption of the delivery service during the period of switching from one communication path to the other at the mobile terminal.

SUMMARY OF THE INVENTION

In view of the foregoing circumstances, it is therefore an object of the present invention to provide a method for continuing a delivery service without temporary interruption on the switching of a communication path at a mobile terminal.

Accordingly, a content delivery system according to the present invention allows a user to continuously receive a service even during the delivery of a content of which strict real-time performance is required, such as a video content, by switching a communication path in the course of communication without suffering a temporary suspension of a video or sound playback.

Since the present invention establishes delivery sessions for the URLs of contents each encoded from the same source data and having a plurality of bit rates, the content with the bit rate suited to the current throughput of each of the communication paths can be selected properly at any time. Even if the throughput of the communication path after switching greatly differs from that of the communication path prior to switching, the present invention allows the continuation of the content delivery service suited to the communication path after switching.

Thus, the present invention allows the delivery service of a content of which strict real-time performance is required to be provided continuously without temporary interruption even on a plurality of communication paths having different characteristics and on a communication path at a greatly fluctuating communication speed. By using currently prevalent mobile terminals, therefore, excellently convenient services can be provided to users.

To attain the foregoing object, a communication proxy apparatus in the content delivery system according to the present invention is characterized by temporarily establishing two sessions at the same time, which are the session on a communication path prior to switching and the session on a communication path after switching, between itself and a mobile terminal.

On the other hand, a communication terminal apparatus in the content delivery system according to the present invention is characterized by switching the sessions with a proper timing based on elapsed time information from the beginning of data received from the two communication paths before and after switching.

The foregoing characteristics allow a user to continuously receive the delivery service on a new communication path without a temporary interruption of the delivering service.

BRIEF DESCRIPTION OF THE DRAWINGS

FIG. 4 is a view showing examples of a content set request and content set information in the content delivery system according to Embodiment 1;

FIG. 5 is a view showing an example of client information in the content delivery system according to Embodiment 1;

FIG. 6 is a view showing an example of a session management table at each of a client terminal and the proxy server in the content delivery system according to Embodiment 1;

FIG. 12 is a view showing an example of a client report in the content delivery system according to Embodiment 1;

FIG. 25 is a flow chart showing an example of a communication path switching judging step in the client information managing process at the proxy server in the content delivery system according to Embodiment 1.

DETAILED DESCRIPTION OF THE PREFERRED EMBODIMENTS

Figure 1:
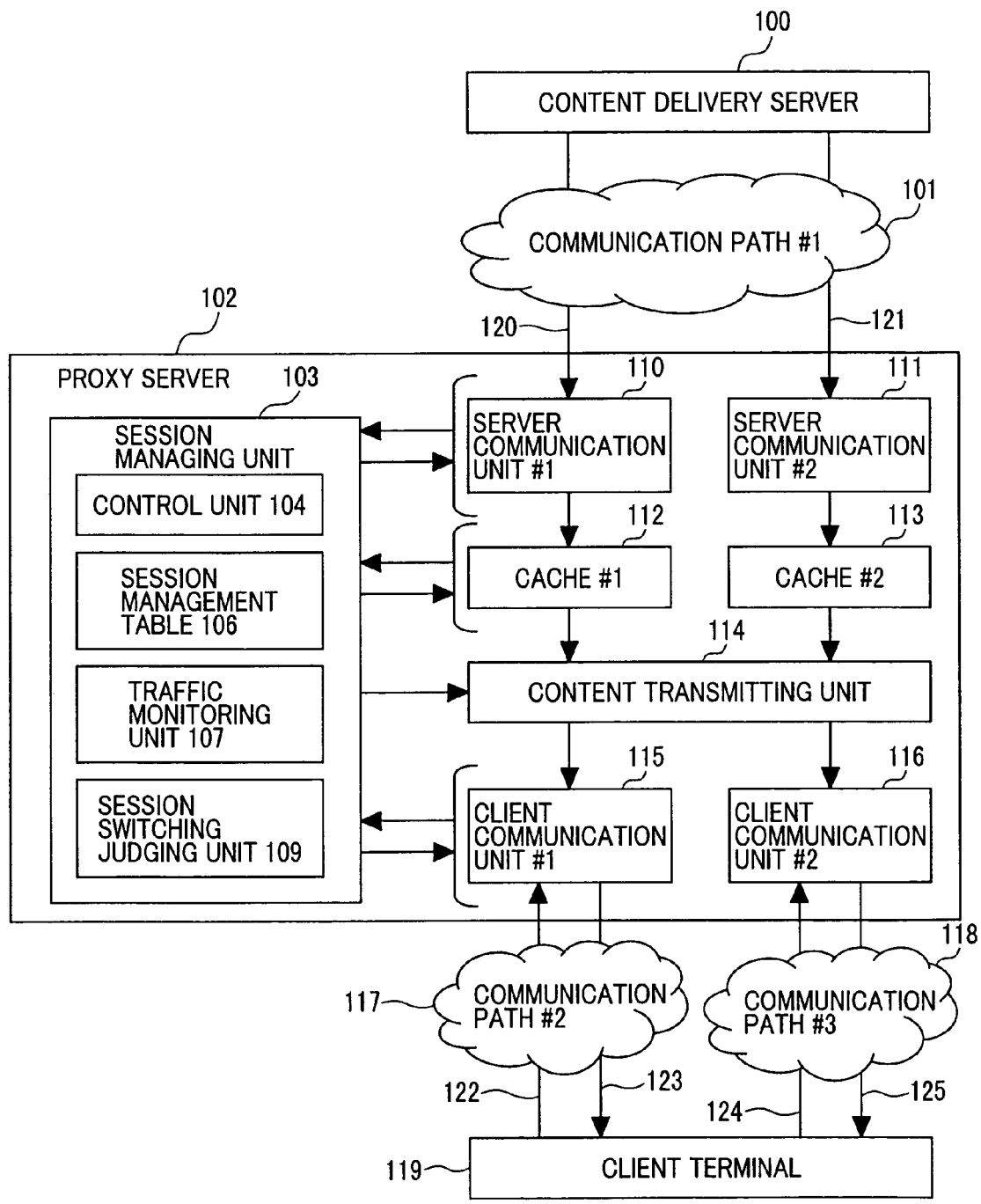
FIG. 1 is a block diagram showing an exemplary structure of a proxy server in a content delivery system according to Embodiment 1 of the present invention.

Referring now to the drawings, the embodiments of the present invention will be described herein below.

A description will be given to a content delivery system according to Embodiment 1 of the present invention with reference to FIGS. 1 to 19. It will easily be appreciated that processes performed subsequently at a server and at a terminal apparatus can be implemented not only by a method using a hardware configuration but also by reading a program for executing the subsequent processes or by a cooperative operation involving both hardware and software processes.

Figure 2:
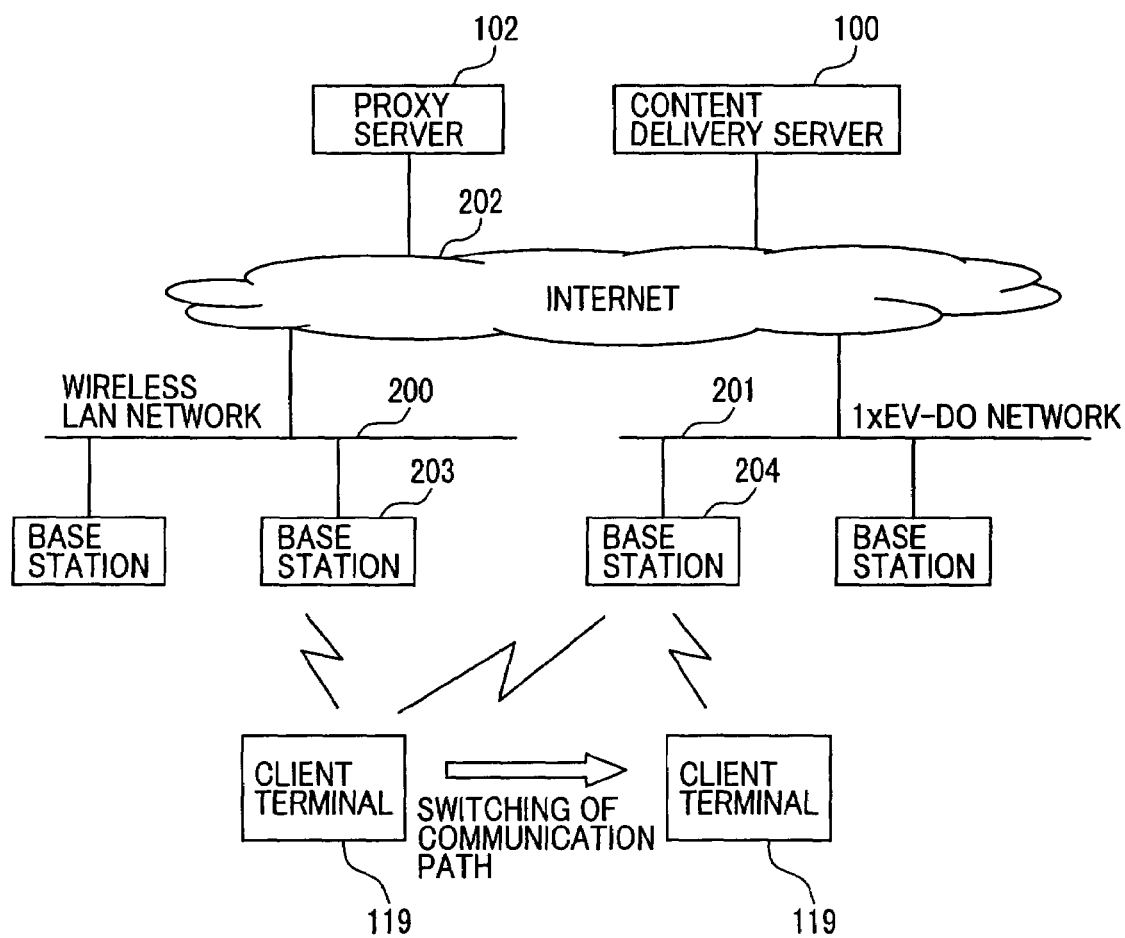
FIG. 2 is a view showing an exemplary structure of a network in the content delivery system according to Embodiment 1.

FIG. 2 is a view showing an exemplary structure of a communication network in the content delivery system according to Embodiment 1. In the example of the drawing, a content delivery server 100 and a proxy server 102 are connected to each other via the Internet network 202. A client terminal 119 is capable of wireless communication between itself and a base station 203 and connected to a wireless LAN network 200. The wireless LAN network 200 is connected to the Internet network 202 so that the client terminal 119 is connected to the Internet network 202 via the wireless LAN network 200. The client terminal 119 is also capable of wireless communication between itself and a base station 204 and connected to the 1xEV-DO (cdma 2000 1xEvolution Data Only) network 201. The 1xEV-DO network 201 is connected to the Internet network 202 so that the client terminal 119 is connected to the Internet network 202 via the 1xEV-DO network 201.

In the example of FIG. 2, the client terminal 119 receives a content delivery service from the content delivery server 100 via the proxy server 102. Specifically, the client terminal 119 transmits, to the proxy server 102, a content delivery request to the content delivery server 100 and the proxy server 102 transfers the received content delivery request to the content delivery server 100. Upon receipt of the content delivery request from the proxy server 102, the content delivery server 100 delivers requested content data to the proxy server 102. The proxy server 102 transfers the content data received from the delivery server 100 to the client terminal 119.

A detailed description will be given herein below to process steps at the proxy server 102 and at the client terminal 119 in the case of switching a video delivery service session established on the wireless LAN network 200 to the 1xEV-DO network 201.

FIG. 1 is a view showing a structure of the proxy server 102. Server communication units 110 and 111 are portions for performing data transmission/reception to and from the content delivery server 100 via a communication path #1 (101). Caches 112 and 113 are portions for storing respective content data sets 120 and 121 received by the server communication units #1 (110) and #2 (111). A content transmitting unit 114 is a portion for passing the content data stored in either or both of the caches #1 (112) and #2 (113) to client communication units #1 (115) and #2 (116). The client communication units #1 (115) and #2 (116) are portions for performing the transmission/reception of the content data to and from the client terminal 119 via communication paths #2 (117) and #3

(118). A session managing unit 103 is composed of a control unit 104, a session management table 106, a traffic monitoring unit 107, and a session switching judging unit 109. The communication path #1 (101) in FIG. 1 corresponds to the Internet network 202 in FIG. 2. The communication path #2 in FIG. 1 corresponds to the wireless LAN network 200 in FIG. 2. The communication path #3 (118) in FIG. 1 corresponds to the 1×EV-DO network 201 in FIG. 2.

An example of the foregoing session management table 106 is shown in FIG. 6A. The session management table 106 in the drawing is composed of session information, communication path information, and content set information. The session information is composed of at least the ID of a content (corresponding to the ID in the content set information) delivered at least in the current session, cache information, and client communication information. The cache information is for managing data stored in the foregoing caches #1 (112) and #2 (113) and includes, e.g., a content time range of the content data in each of the caches, a data size in each of the caches, a content time range of the content data already transmitted, and the like. The client communication information is on communication between the clients and includes information on the IP addresses and port numbers of the client terminals which allows user identification, information on a communication protocol between client terminals, and information on a time at which the latest content is received by each of the client terminals, the reception throughput of the client terminal, and the history thereof. The communication path information is on each of communication paths usable at the client terminal 119 and includes information on, e.g., the IP addresses of the clients, the type and maximum throughput of each of the communication paths, a priority, a current throughput, and the history thereof. The content set information indicates a set of plural contents each encoded from the same source data and having different attributes. An example 402 of the content set information (http://server/contentset-.info) is shown in FIG. 4B. In the example 402 of the content set information, URLs ('http://server/content.mp4?br=512' and 'http://server/content.mp4?br=256') indicating a plurality of sites in which content files having different attribute information sets on contents each encoded from the same source data and attribute information sets 403 and 404 on the respective contents indicated by the individual URLs are described. Each of the attribute information sets 403 and 404 includes information on file types and an average content rate since a selection is made between the contents to be switched depending on at least a communication speed or on which coding method the terminal supports. Besides, a total time and media information are also stored. The media information is identified based on media types and specific detailed information on each of the media types is described. In the example of FIG. 4, if the media type is "Video", a codec type, an average rate, an image width, an image height, and a frame rate are described. If the media type is "Audio", a codec type, an average rate, and the number of channels are described. Although each of the contents indicated by the attribute information sets 403 and 404 is encoded from the same data, they have different bit rates.

Figure 15:
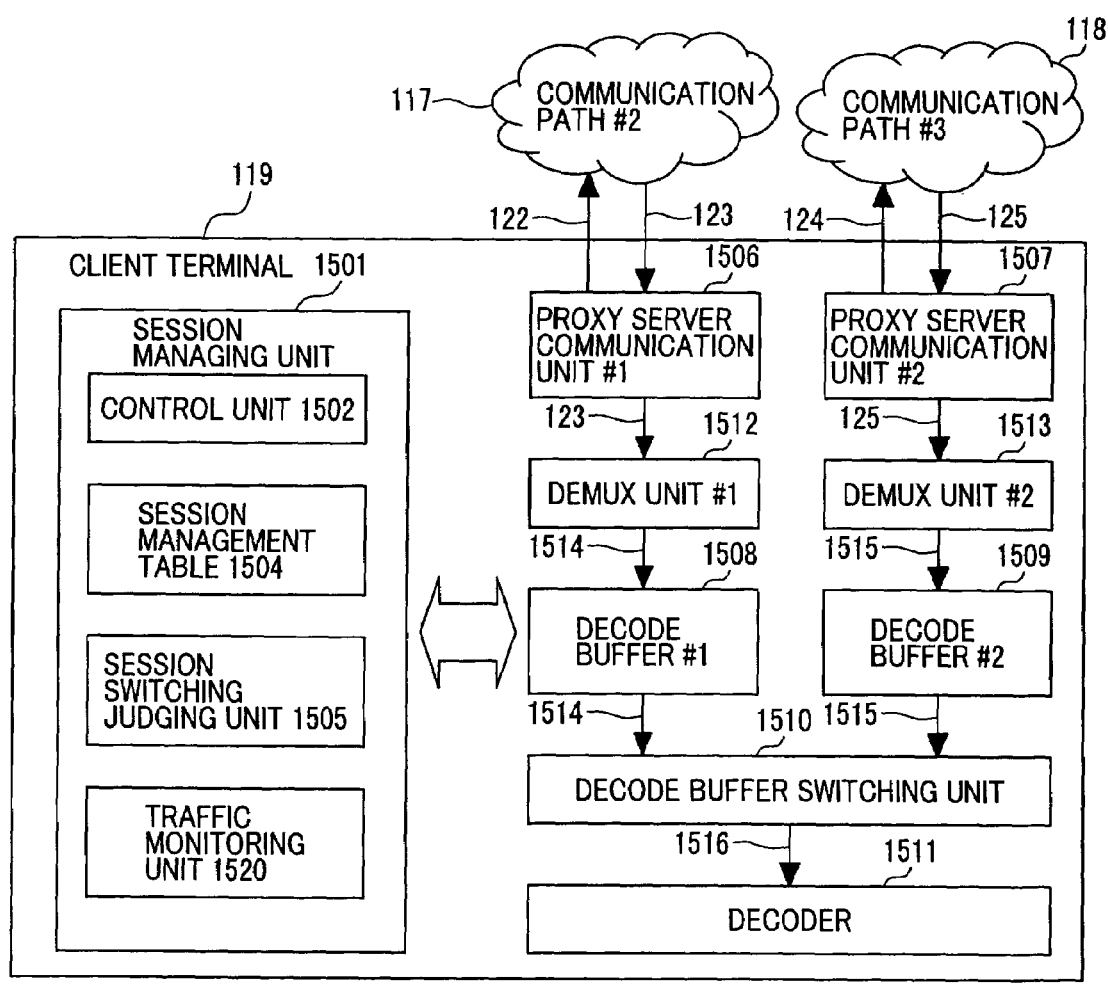
FIG. 15 is a block diagram showing an exemplary structure of the client terminal in the content delivery system according to Embodiment 1.

FIG. 15 is a view showing a structure of the client terminal 119. Proxy server communication units 1506 and 1507 are portions performing data transmission/reception to and from the proxy server 102 via the respective communication paths #2 (117) and #3 (118). Demux units 1512 and 1513 are portions for analyzing the header information of content data sets (123 and 125) received by the respective proxy server communication units #1 (1506) and #2 (1507) to extract media data sets (e.g., video/audio coding data sets) (1514 and 1515). Decode buffers 1508 and 1509 are for storing therein the respective media data sets (1514 and 1515) extracted by the Demux units #1 (1512) and #2 (1513). A decode buffer switching unit 1510 is a portion for performing switching to pass, to a decoder 1511, either of the media data sets (1514 and 1515) in the decode buffers #1 (1508) and #2 (1509). The decoder 1511 is a portion for decoding the media data 1516 passed thereto from the decode buffer switching unit 1510. The session managing unit 1501 is composed of a control unit 1502, a session management table 1504, a session switching judging unit 1505, and a traffic monitoring unit 1520.

An example of the foregoing session management table 1504 is shown in FIG. 6B. The session management table 1504 in the drawing is composed of session information, communication path information, and content set information. The session information is composed of at least the ID of a content (corresponding to the ID in the content set information) under reception in the current session, decode buffer information, reception information, and the communication path information. The decode buffer information is for managing the media data stored in the foregoing decode buffers #1 (1508) and #2 (1509) and includes, e.g., the content time range of the media data in the decode buffer, a data size in the decode buffer, and a random access position (RAP) time. The reception information is for managing data reception at each of the client terminals and includes, e.g., information on the IP addresses and port numbers of the proxy servers and a communication protocol therebetween and information on the reception throughput of the client terminal and the history thereof. The communication path information and the content set information are the same as those in the foregoing session management table 106.

Figure 3:
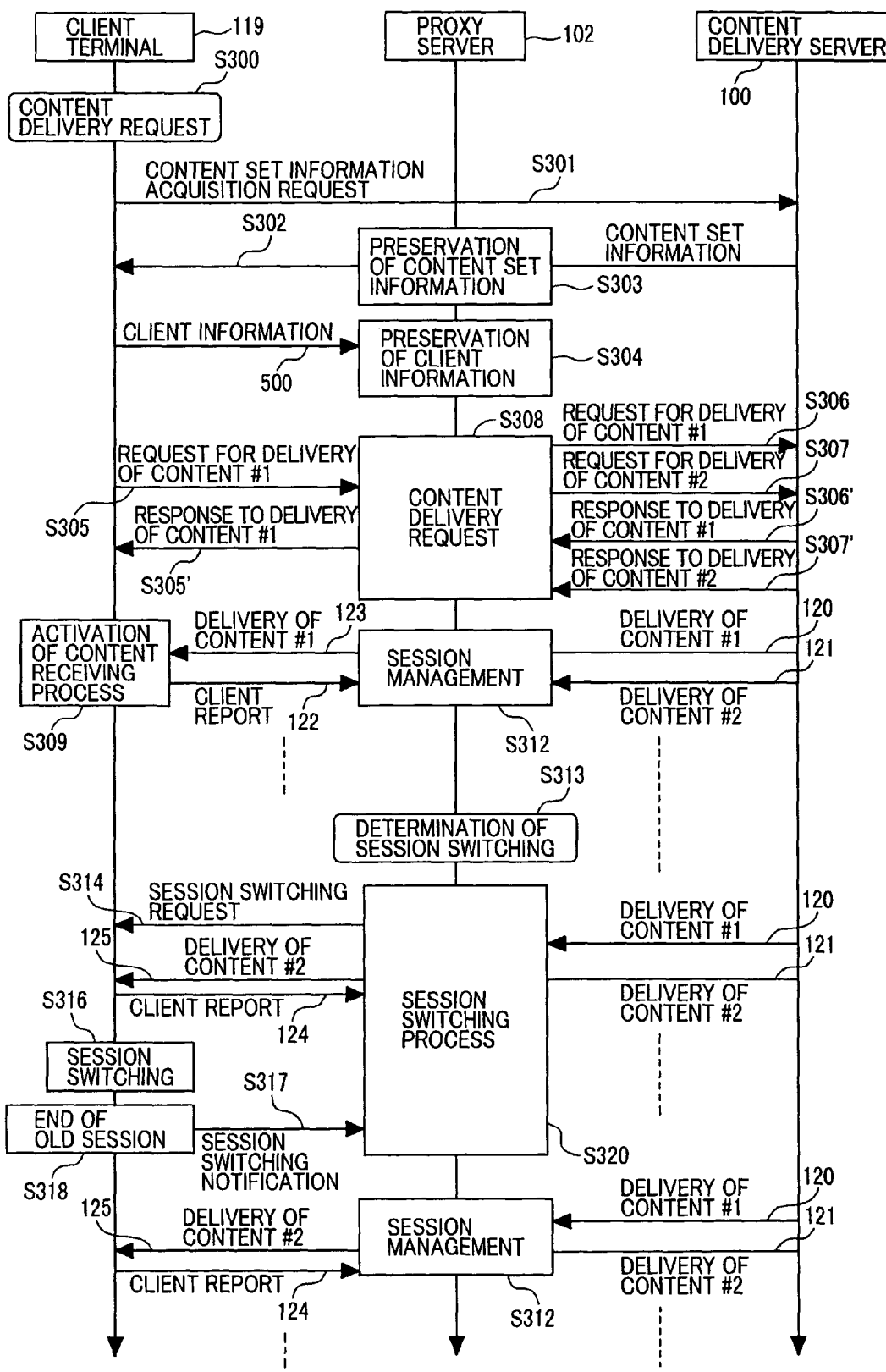
FIG. 3 is a view showing an example of a process flow in the content delivery system according to Embodiment 1.

FIG. 3 is a view showing, along the time axis, individual process steps at the client terminal 119, at the proxy server 102, and at the content delivery server 100 from the initiation of a video delivery service session on the communication path #2 (117) till the switching of the communication path to the communication path #3 (118). The following is the outline of a process flow shown in the drawing.

(1) The client terminal 119 transmits a content delivery request to the proxy server 102 via the communication path #2 (117) and establishes a session for content delivery service. The content delivery server 100 transmits content data to the client terminal 119 via the proxy server 102.

(2) As the client terminal 119 moves away from the base station 203 (FIG. 2), A radio field intensity from the base station becomes lower so that the throughput of data reception from the wireless LAN network 200, i.e., from the communication path #2 (117) is reduced. If the proxy server 102 detects the reduced throughput between the between the client terminal 119 and the communication path #2 (117), the proxy server 102 determines the switching of the path for delivering video data to the client terminal 119 to the 1×EV-DO network 201, i.e., the communication path #3 (118).

(3) The proxy server 102 constantly manages information on the content delivery session established on the communication path #2 (117) and establishes a new content delivery session on the communication path #3 (118) by referring to the session information. It is to be noted that the new delivery service session is temporally synchronized with the delivery service session already established on the communication path #2 (117) and offers a video content encoded from the same source data as the content being received in the already established session (the contents may have different bit rates).

(4) At the client terminal 119, the elapsed time from the beginning of each of the content data received from both of the communication paths #2 (117) and #3 (118) is examined and the content data to be decoded is switched from the content data received from the communication path #2 (117) to the content data received from the communication path #3 (118) such that a video is presented with temporal continuation.

(5) When the switching in the foregoing (4) is completed at the client terminal 119, the proxy server 102 ends the content delivery session on the communication path #2 (117)

Referring to FIG. 3, a detailed description will be given herein below to the process steps at the delivery server 100, at the proxy server 102, and at the client terminal 119 in the foregoing flow.

If a content delivery request event occurs at the client terminal 119 under an instruction of the user or the like in FIG. 3 (S300), the client terminal 119 transmits a content set information acquisition request 401 to the proxy server 102 (S301). An example of a URL ("http://server/contentset.info") for the content set information acquisition request 401 is shown in FIG. 4A. The proxy server 102 transmits the content set information acquisition request 401 to the delivery server 100 (S301) Upon receipt of the content set information acquisition request 401, the delivery server 100 transmits the requested content set information 402 to the proxy server 102 (S302).

When the proxy server 102 receives the content set information 402 described above in FIG. 3 (S302), the proxy server 102 stores the information in the session management table 106 (FIG. 1) (S303). Thereafter, the proxy server 102 transmits the received content set information 402 to the client terminal 119 (S302). At the client terminal 119, the received content set information 402 is stored in the session management table 1504 in the client terminal 119. The session management table 1504 will be described later in greater detail.

Next, the client terminal 119 transmits client information 500 on the client terminal itself to the proxy server 102 (S320). An example of the client information 500 is shown in FIG. 5. In the example of the drawing, information 501 on the communication path #2 (117 in FIG. 1), information 502 on the communication path #3 (118 in FIG. 1), and terminal capability information 503 are described as the client information 500 (S302). In each of the communication path information sets 501 and 502, the type of a communication path, a maximum throughput, an IP address, and the priority of the communication path (the higher value is assumed to have the higher priority) are described. In the terminal capability information 503, the codec type supported by the terminal, a maximum rendering size, a CPU clock, and a memory capacity are described. Upon receipt of the client information 500, the proxy server 102 stores it in the session management table 106 described above (S304).

The client terminal 119 selects, from the received content set information 402, the URL for one content based on, e.g., a directive operation by the user or a throughput of the communication path currently established at the terminal and transmits a content delivery request to the proxy server 102 (S305). Upon the receipt of the content delivery request (S306), the proxy server 102 executes a content delivery requesting step S308.

The content delivery requesting step S308 is summarized in the following two functional features, which are: (1) continuous reception of a plurality of contents each encoded from the same source data and having different attributes (e.g., different bit rates or the like) from the delivery server 100 in addition to the content indicated by the URL requested by the client terminal 119; and (2) delivery of only the content requested by the client terminal 119.

The functional feature (1) is implemented by the following flow. In the content delivering step S308, the control unit 104 compares the URL for the received content delivery request with the content set information stored in the session management table 106 (which will be described later) and thereby acquires a URL for a content encoded from the same source data but having a different attribute in addition to the content specified by the content delivery request. Then, the control unit 104 transmits a content delivery request for each of the acquired URLs to the delivery server 100 (S306 and S307). Although the present embodiment need not necessarily transmit the foregoing delivery request for the URL for the content other than the URL for the content specified at the client terminal 119 in the functional feature (1) mentioned above, it is assumed in the present description that the delivery requests S306 and S307 are transmitted to the delivery server 100.

Figure 7:
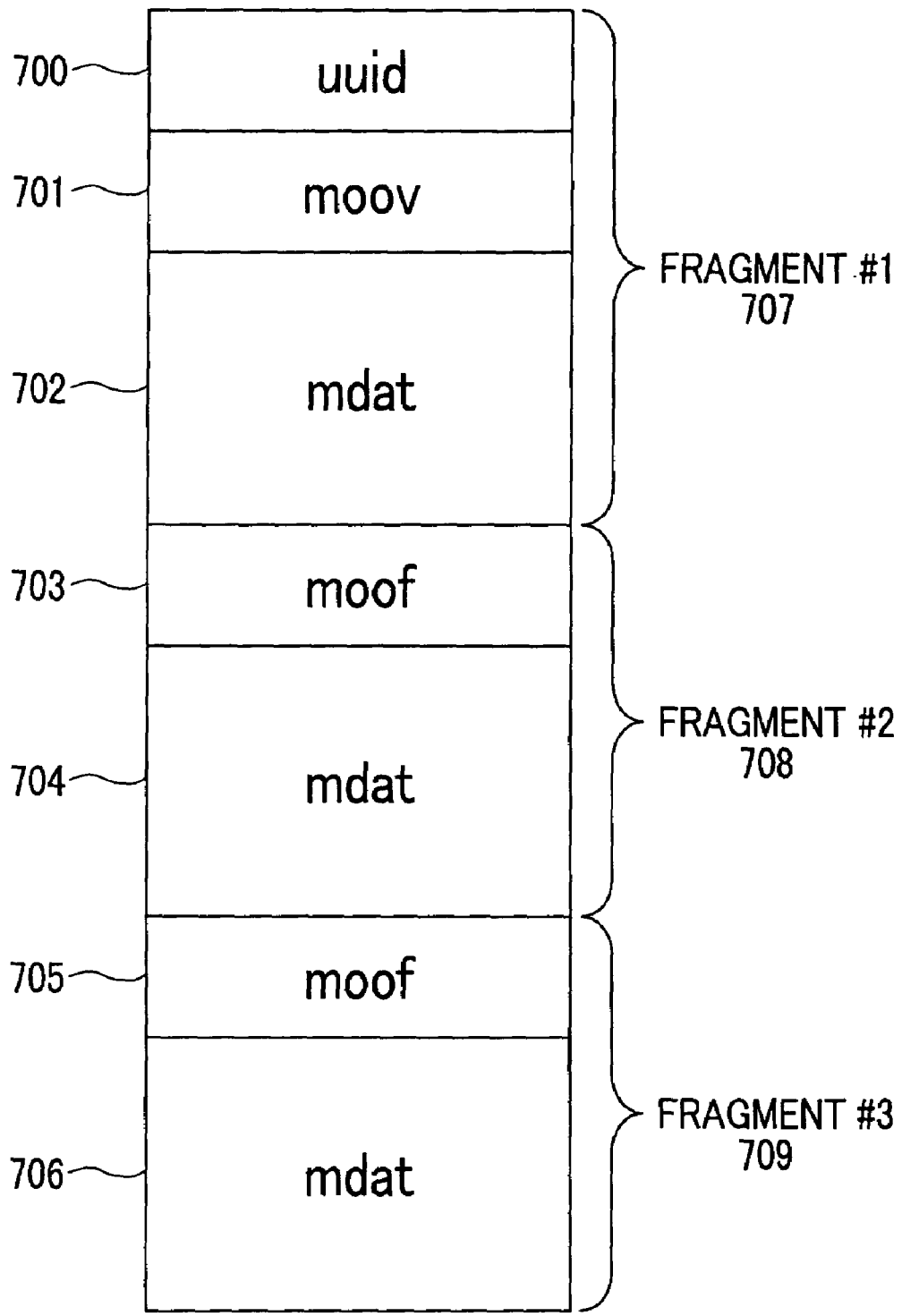
FIG. 7 is a view showing an example of the format of content data in the content delivery system according to Embodiment 1.

Upon receipt of the delivery requests S306 and S307, the content delivery server 100 transmits, to the proxy server 102, responses to these content delivery requests (S306' and S307'). Upon receipt of the responses to content delivery (S306' and S307'), the proxy server 102 transmits, to the client terminal 119, the response to content delivery (which is S306' in the example of FIG. 3) corresponding to the content delivery request (S305) from the client terminal 119 as the response to content delivery (S305'). Thereafter, the delivery server 100 starts the delivery of the content data 120 and 121 corresponding to the content delivery requests (S306 and S307) to the proxy server 102. The proxy server 102 activates a session managing process S312 and transmits, to the client terminal 119, the content data (which is 120 in the example of FIG. 3) corresponding to the content delivery request (S305) from the client terminal 119. An example of the format of the content data 120 and 121 delivered from the delivery server 100 to the proxy server 102 and of the content data 123 and 125 delivered from the proxy server 102 to the client terminal is shown in FIG. 7. FIG. 7 is a structural view of a content data set using a file format determined by the ISO/IEC14496-12: (commonly termed MP4). In the drawing, the uuid (700) indicates a place for storing uniquely defined data. The present embodiment designates the uuid (700) as an elapsed time from the beginning of the content. Even when the data is delivered halfway through the content, the information in the uuid allows the receiver to acquire information on the received content data about how much time has elapsed from the beginning of the whole content. The uuid (700) is given for the purpose of providing temporal synchronization between a plurality of content data described in the content set information 402. In FIG. 7, the moov (701) indicates a place for storing leading header information, the mdat (702, 704, or 706) indicates a place for storing media data such as video or audio, and the moof (703) indicates a place for storing information on the second and subsequent headers. The present assumes that the uuid (700), the moov (701), and the mdat (702) compose a fragment #1 (707) and the subsequent groups of moofs and mdats compose fragments #2 (708) and #3 (709) and that transmission is performed by the TCP/IP communication on a per fragment basis. However, the present invention is not dependent on the format of a content or a communication protocol. It is also possible to packet the media data in, e.g., the RTP (Real-Time Transfer Protocol) format, not in the MP4 file format, and to transmit it by the UDP/IP communication. If a plurality of contents described in the content set information S302 are delivered, however, it is necessary to add any form of information on currently delivered data about how much time has elapsed from the beginning of the content, such as the uuid (700) mentioned above.

Figure 8:
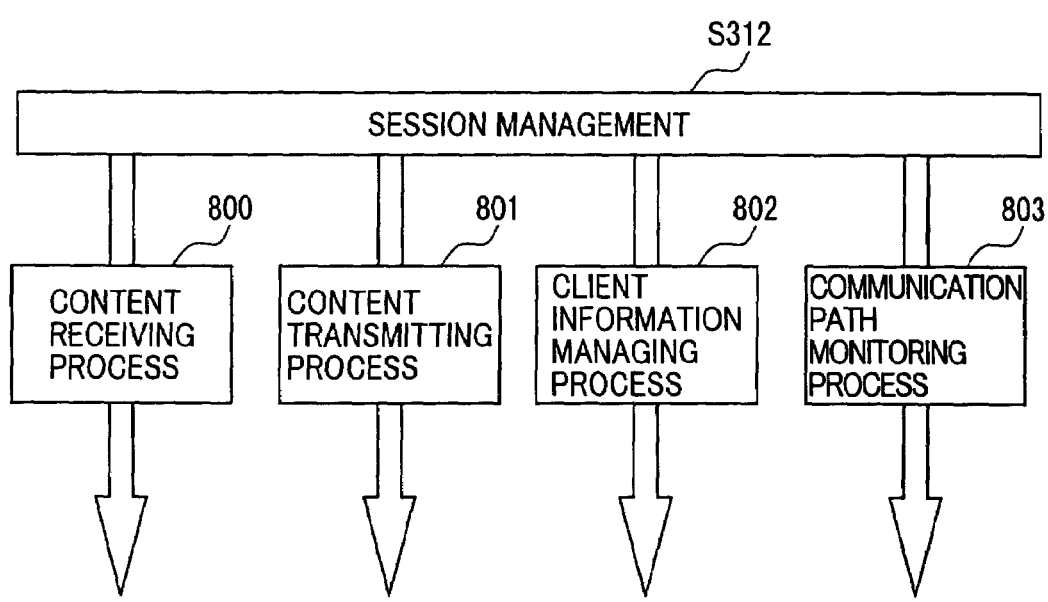
FIG. 8 is a view showing an exemplary structure of a session managing process at the proxy server in the content delivery system according to Embodiment 1.

A detailed description will be given to the session managing process S312 at the proxy server 102 in FIG. 3. As shown in FIG. 8, a content receiving process 800, a content transmitting process 801, a client information managing process 802, and a communication path monitoring process 803 are operating independently in the session managing process S312. The following is the detailed description of the individual processes.

Figure 9:
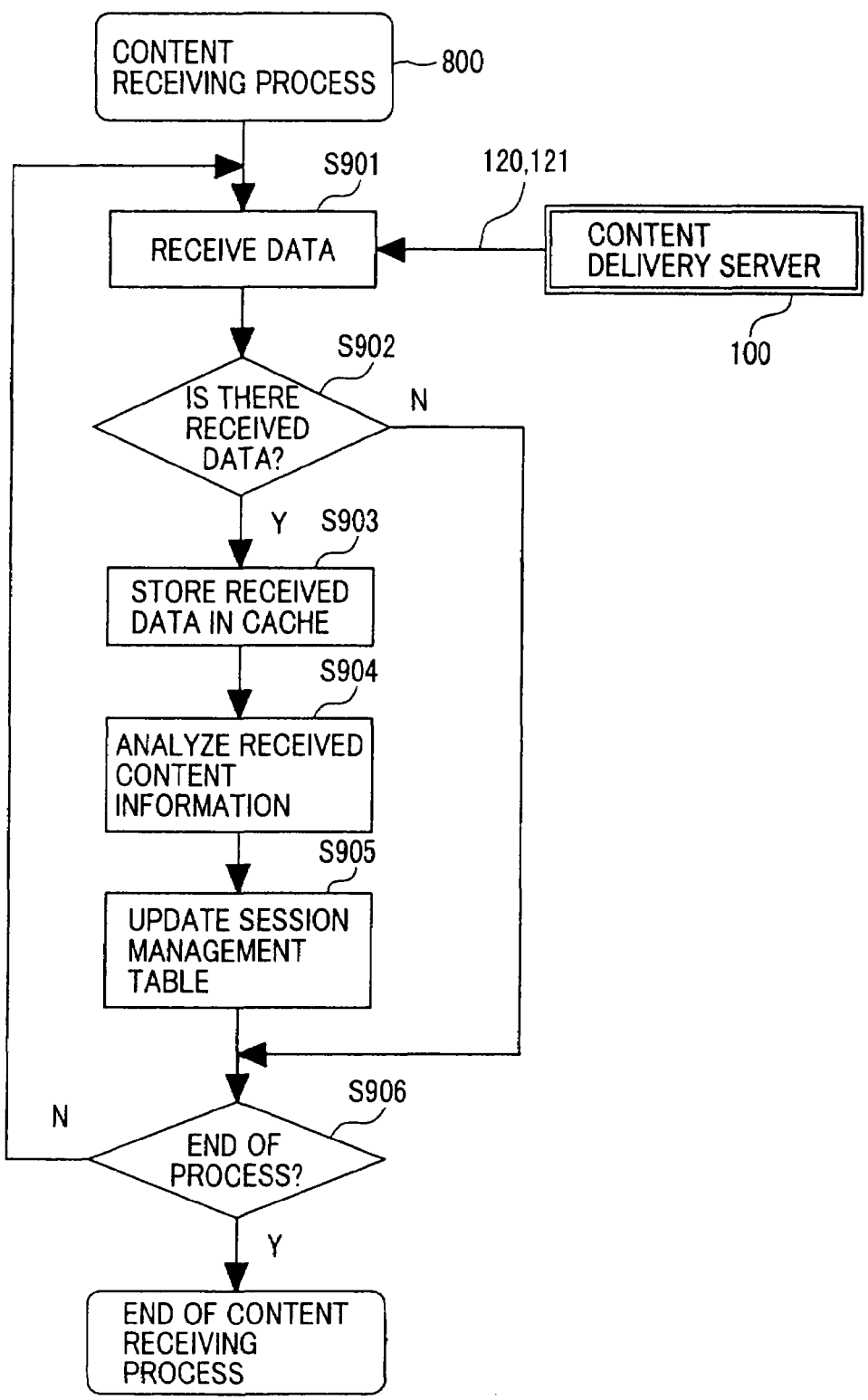
FIG. 9 is a flow chart showing an example of a content receiving process at the proxy server in the content delivery system according to Embodiment 1.

A detailed description will be given to the content receiving process 800 with reference to FIG. 9. In the content receiving process 800, each of the server communication units (110 and 111) performs the step of receiving data from the content delivery server 100 (S901). Next, each of the server communication units (110 and 111) examines the presence or absence of received data (S902) and, if the presence of the received data is recognized, stores the received data in caches (which are 112 and 113 in FIG. 1) (S903). Then, the received content managing unit 105 in FIG. 1 analyzes the latest received content information stored in the cache (112 or 113) (S904).

The received content information in Step S904 includes the time range of the received content, the average bit rate of the received content, and the like. These information sets can be acquired from time stamps stored in the header information in the moov (701) (in the case of the leading fragment) or the moof (703 or 795) (in the case of the second or subsequent fragment) in FIG. 7 and from the size of the received data.

The session managing unit 103 preserves the received content information acquired in Step S904 in the session management table 106 (S905). The foregoing process is repeated until a message indicative of the end of the process is generated from the control unit 104 (S906).

Thus, in the content receiving process 800, the received data is stored in the cache, while the session managing unit 103 constantly acquires the elapsed time from the beginning of the content of the received data and the data size and stores these information sets in the session management table 106.

Figure 10:
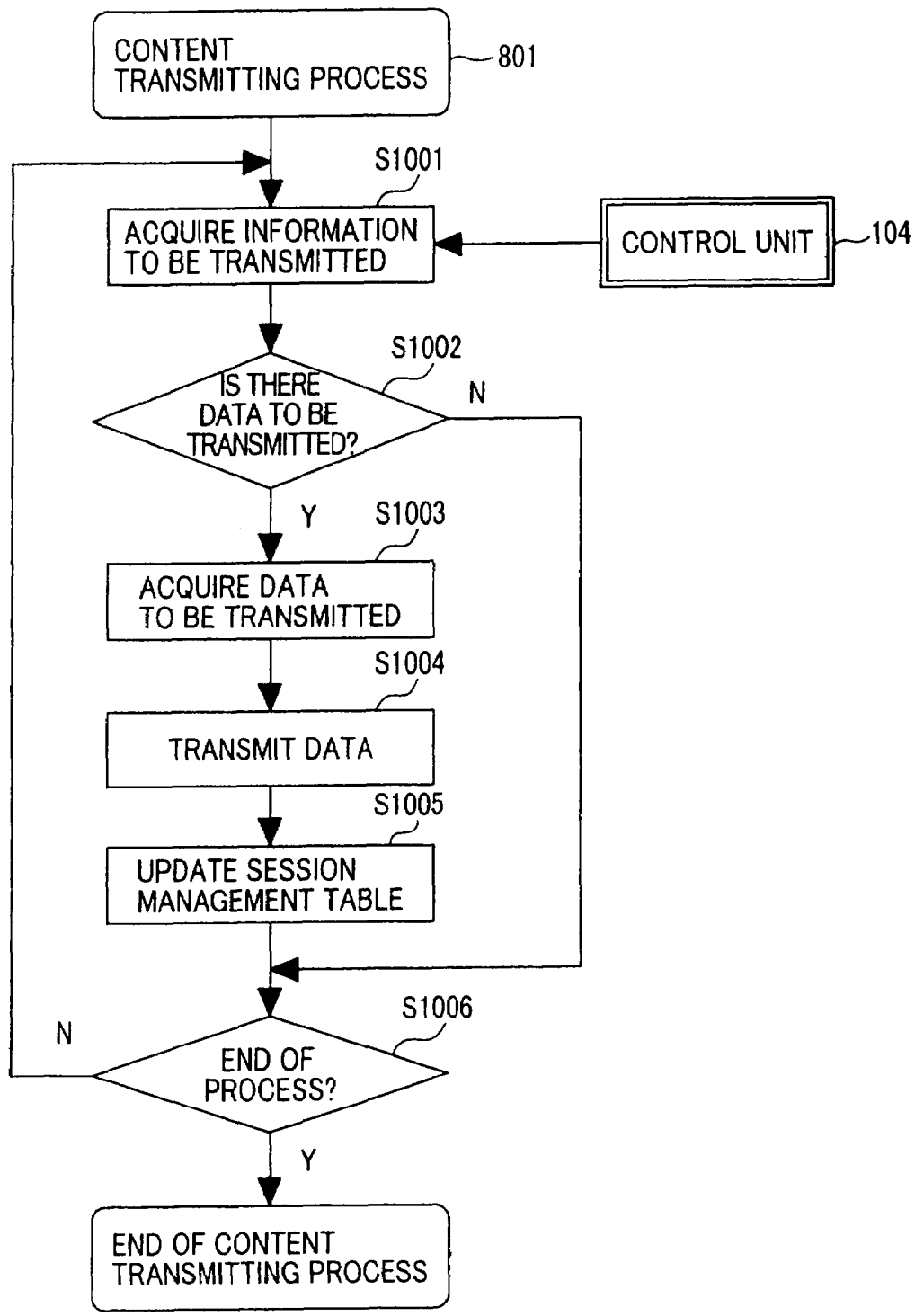
FIG. 10 is a flow chart showing an example of a content transmitting process at the proxy server in the content delivery system according to Embodiment 1.

A detailed description will be given next to the content transmitting process 801 with reference to FIG. 10. The content transmitting process 801 is executed in the content transmitting unit 114 in FIG. 1. In Step S1001, the control unit 104 acquires, from the session management table 106, the content time of the oldest data to be transmitted that has been stored in the cache, the data size, and the data address in the cache and passes these information sets to the content transmitting unit 114. If there is data to be transmitted (S1002), the content transmitting unit 114 acquires the content data from the cache #1 (112) or #2 (113) by using the address and size of the foregoing data to be transmitted (S1003) and passes the acquired content data to the client communication unit #1 (115) or #2 (116). The client communication unit #1 (115) or#2 (116) transmits the content data (123 or 125) to the client terminal 119 via the communication path#2 (117) or#3 (118) (S1004). The control unit 104 stores information on the content time range and average bit rate of the transmitted content data (123 or 125) in the session management table 106 (S1005). The content transmitting process 801 repeats the foregoing process until a message indicative of the end of the process is generated from the control unit 104 (S1006).

Thus, in the content transmitting process 801, the control unit 104 transmits the content data (123 or 125) stored in the cache to the client terminal 119 in the chronological order of reception, the oldest one first, and updates the content time and data size of the already transmitted content data in the session management table 106 on a one-by-one basis.

A detailed description will be given next to the communication path monitoring process 803 with reference to FIG. 13. The communication path monitoring process 803 is executed for the purpose of selecting a content to be transmitted upon switching from the current communication path to another communication path by monitoring the throughput of the communication path (corresponding to the communication path #3 (118) in the flow of FIG. 3) other than the communication path (corresponding to the communication path #2 (117) in the flow of FIG. 3) over which the content is currently delivered to the client terminal 119 and thereby obtaining the throughput after switching beforehand.

Figure 13:
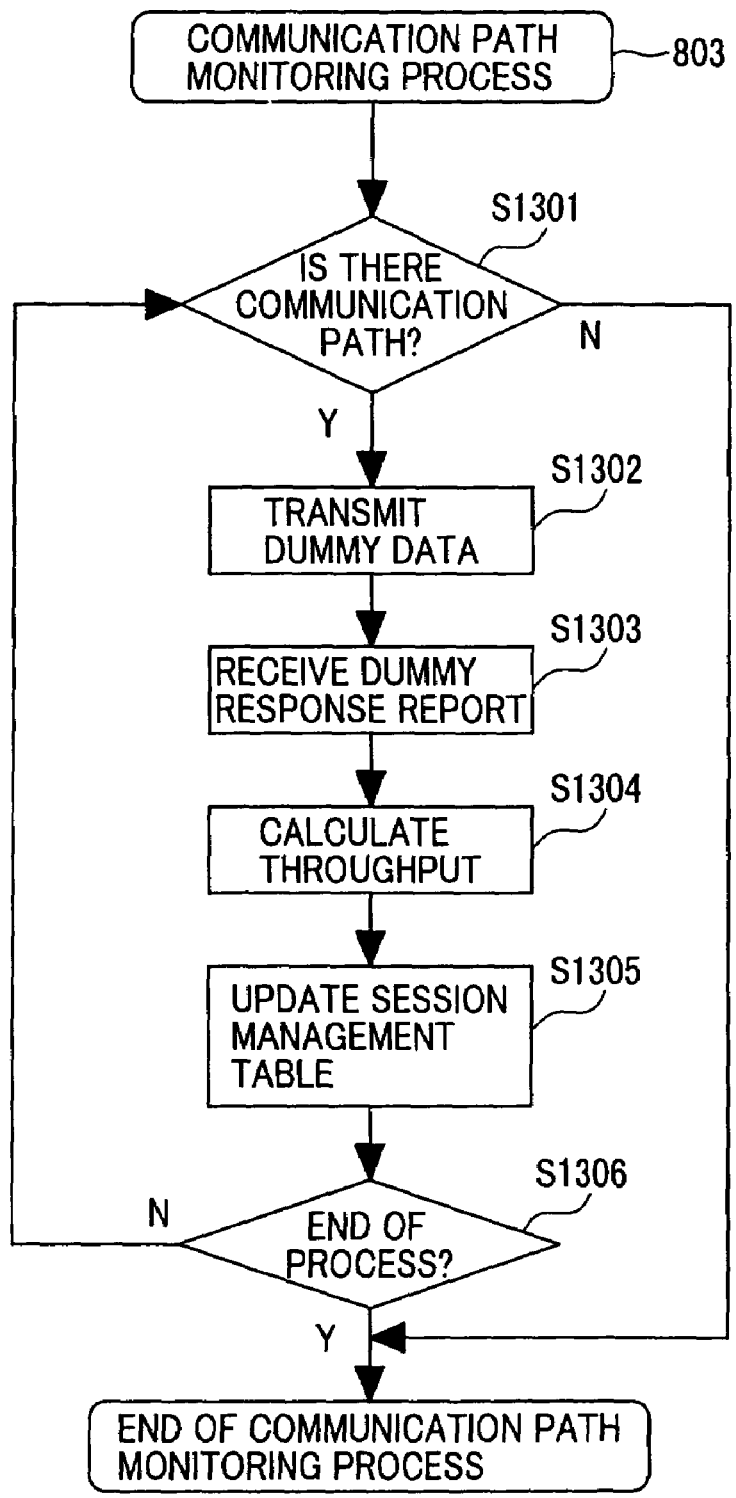
FIG. 13 is a flow chart showing an example of a communication path monitoring process at the proxy server in the content delivery system according to Embodiment 1.

As shown in FIG. 13, when a given communication path has been established in the communication path monitoring process 803 (S1301), the traffic monitoring unit 107 at the proxy server 102 periodically transmits dummy data to the client terminal 119 (S1302). Upon the receipt of the dummy data, the traffic monitoring unit 1520 at the client terminal 119 transmits a report on the received dummy data to the proxy server 102 (S1303). The dummy data report may be transmitted on a per dummy-data-packet basis or, alternatively, one report may be transmitted every time a plurality of dummy data packets is received. There are cases where the format of a report differs depending on a communication protocol. If dummy data is transmitted by using a connection-type communication protocol such as the TCP/IP, e.g., the client is requested to respond to each of TOP packets by giving an ACK message to the proxy server 102. By using the ACK message as a report, the proxy server 102 can easily estimate the throughput of the communication path from the size of each set of dummy data and the time required to transmit the dummy data. If dummy data is transmitted by using a connectionless-type communication protocol such as the UDP/IP, a report in, e.g., the RTCP (Real-Time Control Protocol) format can be used. In the RTCP format, information on the situation in which a plurality of dummy data packets is received is periodically transmitted as a report to the proxy server 102. The detailed description of RTCP is omitted herein.

In Step S1304 in FIG. 13, the traffic monitoring unit 107 at the proxy server 102 calculates the reception throughput of the dummy data at the client terminal 119 based on the dummy data report, which has been received from the client in Step S1303 as described above. The calculated throughput value is recorded in the session management table 106 in Step S1305. The traffic monitoring unit 1520 at the client terminal 119 also calculates the reception throughput and records it in the session management table 1504 in the same manner as described above. The foregoing process is repeated until a message indicative of the end of the process is generated from the control unit 104 (S1306). The foregoing process is performed with respect to each of the communication paths other than the communication path currently used to transmit the content so that the throughput of each of the communication paths other than the currently used communication path is constantly monitored.

The detailed description will be given next to the client information managing process with reference to FIGS. 11, 12, and 25. In the client information managing process 802, the control unit 104 monitors a situation in which the received data is decoded at the client terminal 119 and the throughput of data communication between the client terminal 119 and the proxy server 102.

Figure 11:
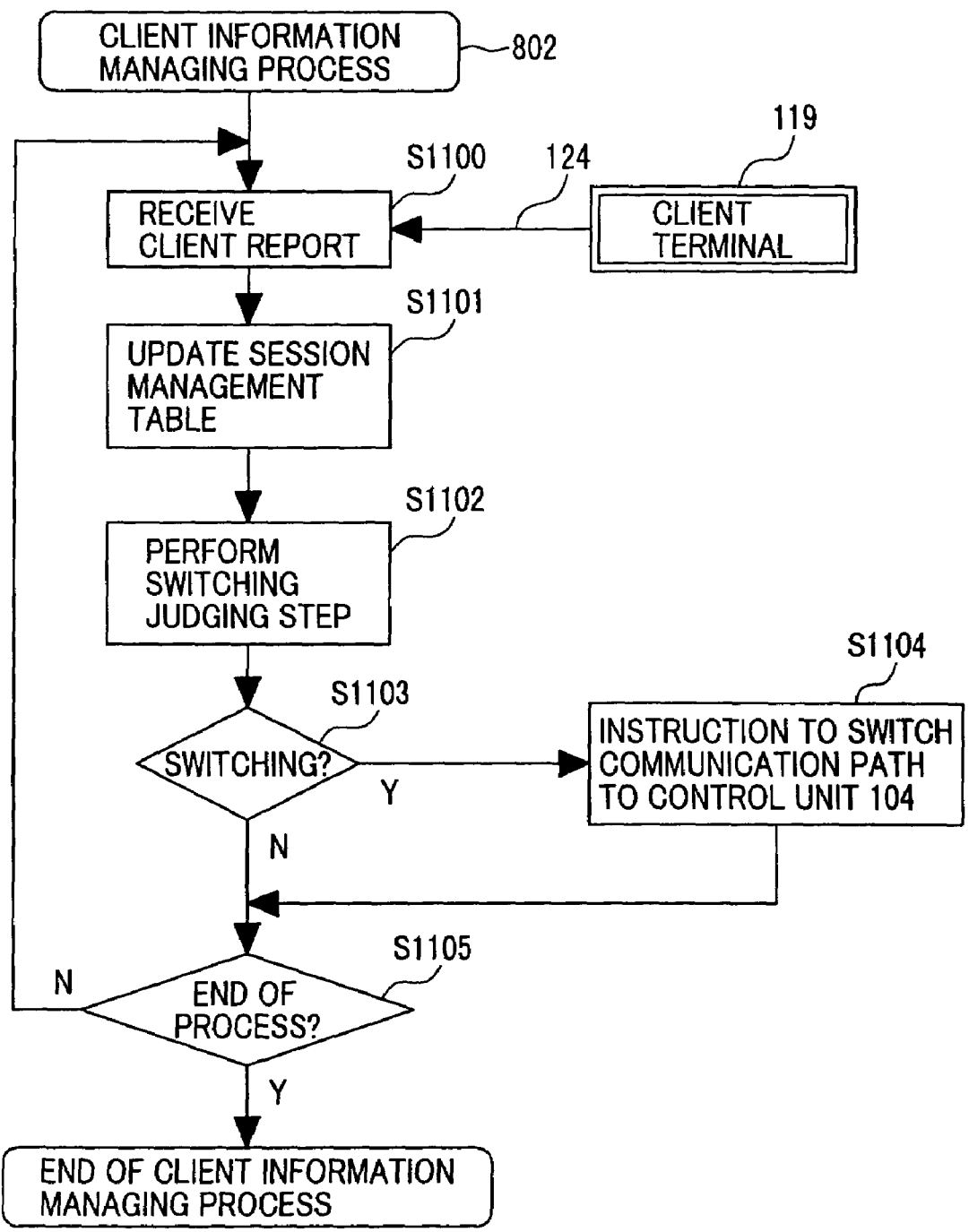
FIG. 11 is a flow chart showing an example of a client information managing process at the proxy server in the content delivery system according to Embodiment 1.

In the client managing process 802 in FIG. 11, the proxy server 102 receives a client report 122 about information on content reception at the terminal, which is sent from the client terminal (S1100). The client terminal 119 periodically transmits the client report 122 to the proxy server 102. An example of the client report 122 is shown in FIG. 12. In the example of FIG. 12, the client report 122 contains information on the receiving situation at the terminal which allows the estimation of whether or not a sufficient throughput for transmitting a content to the client is achieved. At least any one of: (1) the content time of a content received within a given period of time; (2) an amount of the content remaining in the decode buffer; and (3) a packet loss rate within a given range, and the average value of the reception throughput for estimating the current throughput are included therein. Specifically, the start time RSSC of a report range, the end time RESC of the report range, the oldest content time ORCC of content data received within the report range, the latest content time LRCC of content data received within the report range, the size RB of content data received within the report range, the summation ZSC of the time during which content data is not received within the report range, the time LRSC at which the final content data within the report range is received, the time DRCC of the content remaining in the decode buffer, and a packet loss rate PLR within the report range are included.

In Step S1101 in FIG. 11, information in the received client report 122 is acquired and the session management table 106 is updated (S1101). The information in the session management table 106 updated at this time includes the content time of the data received at the client terminal 119 and the reception throughput at the client terminal 119. In the example of the client report 122 in FIG. 12, the content time of the content data received at the client terminal 119 is acquired from the ORSO and LRCC described above. The average throughput ATHR within the report range is given by ATHR=RB/(RESC−RSSC−ZSC), as shown in FIG. 12.

Next, in Step S1102 in FIG. 11, the session switching judging unit 109 performs the step of judging whether or not the communication path should be switched by using the information in the updated session management table 106. A detailed description will be given to the switching judging step S1102 with reference to FIG. 25. In the switching judging step S1102, the session switching judging unit 109 judges whether or not the content delivery can be continued on the current communication path (S2501). As exemplary conditions for judging whether or not the content delivery can be continued on the current communication path, the following conditions can be considered.

(1) The state in which data with a content duration corresponding the time of the report range has not been received (i.e., (LRCC−ORCC)≦(RESC−RSSC)×α (where α is a constant less than 1)) continues for T seconds or longer.

(2) The time DRCC of the content remaining in the decode buffer at the client becomes a threshold value of β seconds or less.

(3) The packet loss rate PLR becomes a given threshold value of γ % or more.

If any of the foregoing conditions (1) to (3) for judgment is met, it is conceivable that the throughput of the current communication path could be lower than the bit rate required to transmit the content data. If none of the foregoing conditions (1) to (3) for judgment is met, it is expected that the content delivery can be continued on the current communication path so that switching is judged to be unnecessary (S2504).

The foregoing conditions (1) to (3) for judgment should be used selectively depending on the communication protocol. In the case where data transmission is performed by using a connection-type communication protocol such as the TCP/IP as in the present embodiment, if a packet loss is detected, the lost packet is transmitted again so that the condition (3) does not occur. However, the re-transmitting step causes a delay so that judgment based on the condition (1) becomes effective. In the case where data transmission is performed by using a connectionless-type communication protocol such as the UDP/IP and if a packet loss is detected, on the other hand, the re-transmitting step does not occur so that judgment based on the condition (3), not on the condition (1), is effective. In the judging step S2501, it is also expected whether or not the throughput of the current communication path will lower in future by referring to not only the foregoing conditions (1) to (3) but also information on the history of the throughput of received data at the client terminal to constantly check whether or not the content delivery can be continued in future. If the client terminal 119 moves away from the base station 203 in FIG. 2, e.g., the situation in which radio field intensity from the base station 203 becomes lower and the reception throughput of video data from the wireless LAN network 200 continues to lower. By examining such a throughput history, it is expected whether or not the content delivery session can be continued on the current communication path and whether or not content delivery using another communication path is possible.

In the foregoing judging step S2501, if the continuation of the content delivery on the current communication path is expected to be impossible, the session switching judging unit 109 judges whether or not the content delivery can be continued on another communication path (S2502).

In the judging step S2502, information on the current throughput history of another communication path is acquired from the communication path information (see FIG. 6A) in the session management table 106 updated in the communication path monitoring process 803 described above and it is examined whether or not a content expected to be deliverable with the current throughput of the other communication path is present by referring to information on the average bit rate of each of contents included in the content set information (see FIGS. 6A and 4B) in the session management table 106. If there is a content expected to be deliverable with the current throughput of the other communication path, it is judged that the content delivery can be continued on the other communication path and switching is judged to be necessary (S2503).

Thus, in Step S1102 in FIG. 11, switching is judged to be necessary if it is judged that the content delivery cannot be continued on the current communication path and that the content delivery can be continued on the other communication path. Otherwise, switching is judged to be unnecessary.

If switching is judged to be necessary in Step S1102 as described above (S1103), the switching of the communication path is requested of the control unit 104 (S1104). In the switching request S1104, a communication path to be used after switching and a new content to be delivered are specified (by using the content ID in the content set information 402). The foregoing process is repeated until a message indicative of the end of the process is generated from the control unit 104 (S1105).

Thus, in the session managing process S312 in FIG. 3, the content receiving process 800, the content transmitting process 801, the client information managing process 802, and the communication path monitoring process 803 are operating independently. In the content receiving process 800, the reception of a content from the delivery server 100 and the management of the received content information are performed. In the content transmitting process 801, the transmission of the content to the client and the management of the transmitted content information are performed. In the client information managing process 802, the measurement of the throughput between the client terminals 119, the management of the decoding information at the client terminal, and the judgment of the switching of the communication path are performed. In the communication path monitoring process 803, the throughputs of the communication paths other than the one on which the session is currently established are measured periodically.

The detailed description will be given next to the content receiving process S309 at the client terminal 119 in FIG. 3.

Figure 16:
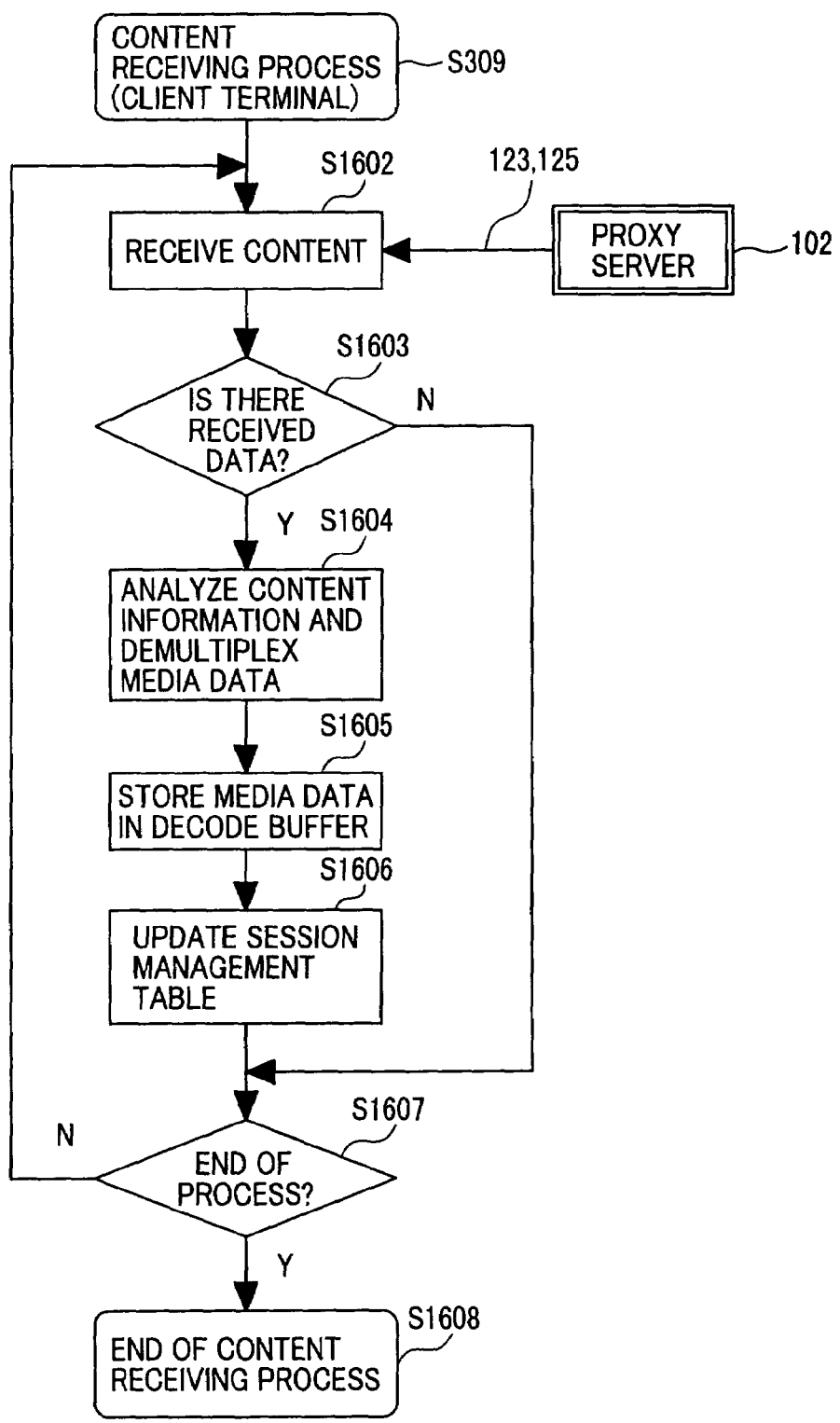
FIG. 16 is a flow chart showing an example of a content receiving process at the client terminal in the content delivery system according to Embodiment 1.

In FIG. 16, the proxy server communication unit (1506 or 1507) receives the content data (123 or 125) from the proxy server 102 (S1602). Upon recognition of the presence of the received content data (123 or 125) (S1603), the proxy server communication unit (1506 or 1507) passes the content data to the Demux unit (1512 or 1513). The Demux unit (1512 or 1513) analyzes the header portion (the moov or moof in FIG. 7) of the received content data, acquires the content information, demultiplexes the media data (1514 or 1515) in the received content data therefrom (S1604), stores the media data in the decode buffer (1508 or 1509) (S1605), and preserves the acquired content information in the session management table 1504 (S1606). The content receiving process S309 repeatedly performs the foregoing process. If an instruction to end the process is given from the control unit 1502 (S1607), the content receiving process S309 is ended (S1608).

A detailed description will be given next to the communication path switching determining event S313 and the process flow subsequent thereto in FIG. 3.

The session switching determining event S313 in FIG. 3 is caused by any of the following factors: (1) The switching of the session is determined by the switching judging step S1103 in the foregoing client information managing process 802 (see FIG. 11) and an instruction to switch the session is issued to the control unit 104 in Step S1104; (2) At the client terminal 119, the switching of the session is requested by a directive operation by the user; (3) At the client terminal 119, the same judging step as the switching judging step S1103 in the foregoing client information managing process 802 is performed to determine the switching of the communication path and a switching request is transmitted to the proxy server 102.

In short, the switching of the communication path is determined by the proxy server 102 in the foregoing factor (1), while the switching of the communication path is determined at the client terminal 119 in each of the foregoing factors (2) and (3). In Embodiment 1 of the present invention, the switching of the communication path determined either at the proxy server or at the client terminal.

If the session switching determining event S313 occurs, the control unit 104 at the proxy server 102 executes the session switching process S320. A detailed description will be given to the session switching process S320 with reference to FIG. 14.

In the session switching process S320, the throughput of the communication path after switching and the content set information are acquired from the session management table 106. By retrieving, in the content set information, a content having the highest average bit rate not more than the throughput of the communication path after switching, the content to be delivered in a new session is selected. In addition, the latest content time ETS already transmitted to the client terminal 119 in the current session is acquired (S1401).

Next, in the session switching process S320, the control unit 104 checks that the content selected in Step S1401 has already been received from the delivery server 100 and whether or not a content data corresponding to the content time ETS acquired in Step S1401 is present in the cache (112 or 113) (S1402). If the content data is not present, the control unit 104 transmits a request for the delivery of the content data (specifying the data at the content time ETS and thereafter) to the delivery server 100 and then executes the delivery requesting step S308 described above. When the delivery requesting step S308 is completed, the delivery server 100 continues to transmit the content at the specified time and thereafter to the proxy server. The control unit 104 activates the content receiving process 800 mentioned above and continues to receive the content from the delivery server 100 thereafter in the content receiving process 800.

Next, in Step S1404, the control unit 104 judges whether or not the data in the cache needs correction when the delivery thereof is started. If the correction is needed, data correction is performed (S1405). As described above, the content delivered in the present embodiment is in the MP4 file format shown in FIG. 7. When any of the fragments in the cache other than the leading one is sent first to the client terminal 119, therefore, it is necessary to convert the format of the header portion moof (703) of the fragment sent first to that of the moov (701). It is also necessary to describe the content time of the current fragment in the uuid of the leading fragment. Thus, if data correction or addition is required in first transmitting any of the fragments in the cache other than the leading one to the client terminal 119 at the initiation of a new session, the control unit 104 performs the correction.

Figure 14:
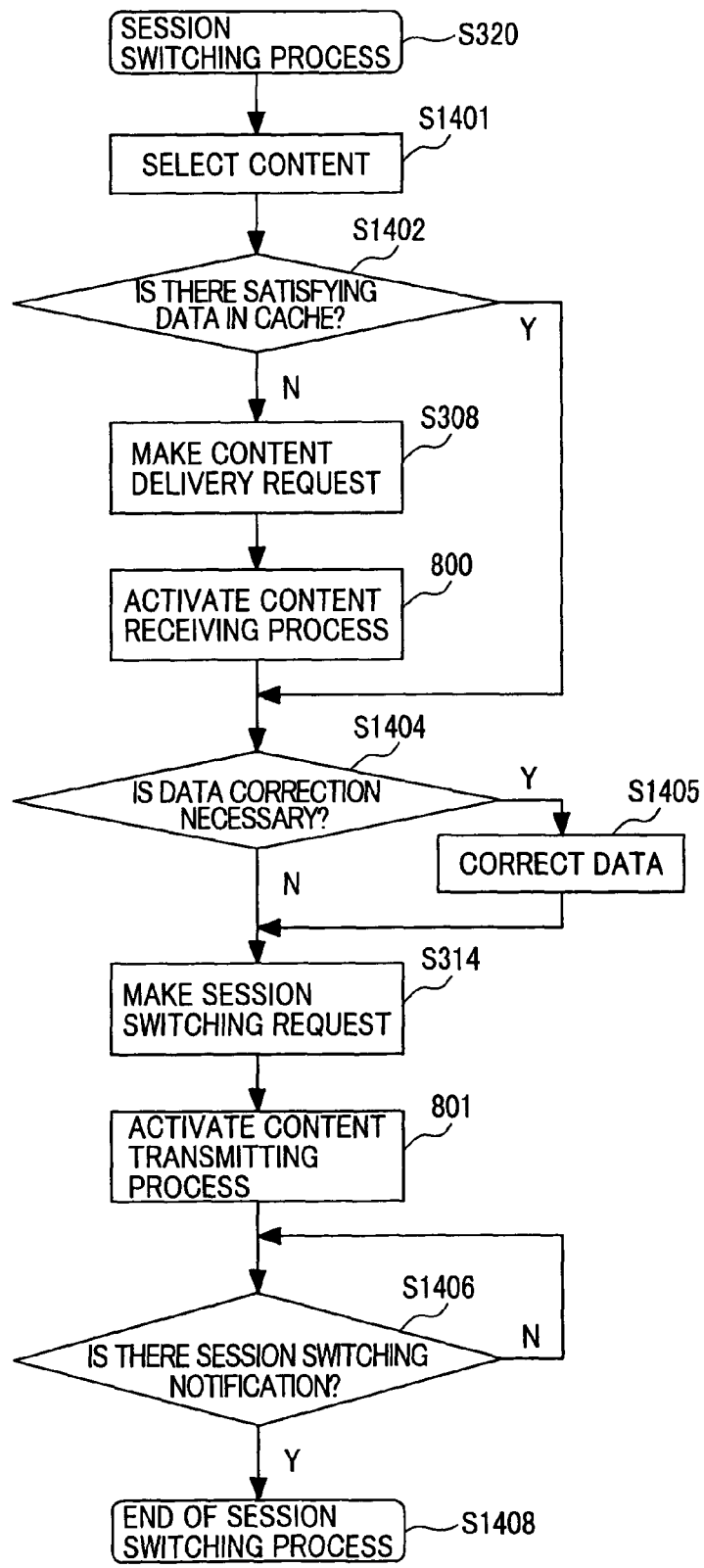
FIG. 14 is a flow chart showing an example of a session switching process at the proxy server in the content delivery system according to Embodiment 1.

When the new content to be delivered to the client terminal 119 is prepared by the foregoing steps in FIG. 14, the proxy server 102 transmits a session switching request to the client terminal 119 (S314 in FIG. 3), activates the content transmitting process 801 described above, and starts the transmission of the new content to the client terminal 119 (125). It follows therefore that, at this point of time, two or more communication paths are connected to the single terminal.

If the switching of the session (S316 in FIG. 3) is completed at the client terminal 119 and the old session is ended (S318), a notification of completed session switching is sent from the client terminal 119 to the proxy server 102 (S317 in FIG. 3). When the proxy server 102 receives the notification S317 of completed session switching in FIG. 14 (S1406), the control unit 104 of the proxy server 102 ends the session switching process S320 (S1408).

A detailed description will be given next to the session switching process S316 at the client terminal 119 with reference to FIGS. 15 and 17.

At the time at which the session switching process S316 is executed, the two content delivery sessions are established simultaneously on the communication path #2 (117) and on the communication path #3 (118) at the client terminal 119 in FIG. 15. The content data 123 and 125 are received independently from the respective communication paths, of which the content data 123 is decoded at the client terminal 119. At the proxy server 102, the content time ETS of the content data 123 already transmitted to the client terminal 119 is processed to serve as the content time at which the transmission of the content data 125 is started in the session switching process S320 described above (see FIG. 14). Consequently, the content data 123 and 125 received independently at the client terminal 119 are in a state in which the respective content times thereof are close to each other.

Figure 17:
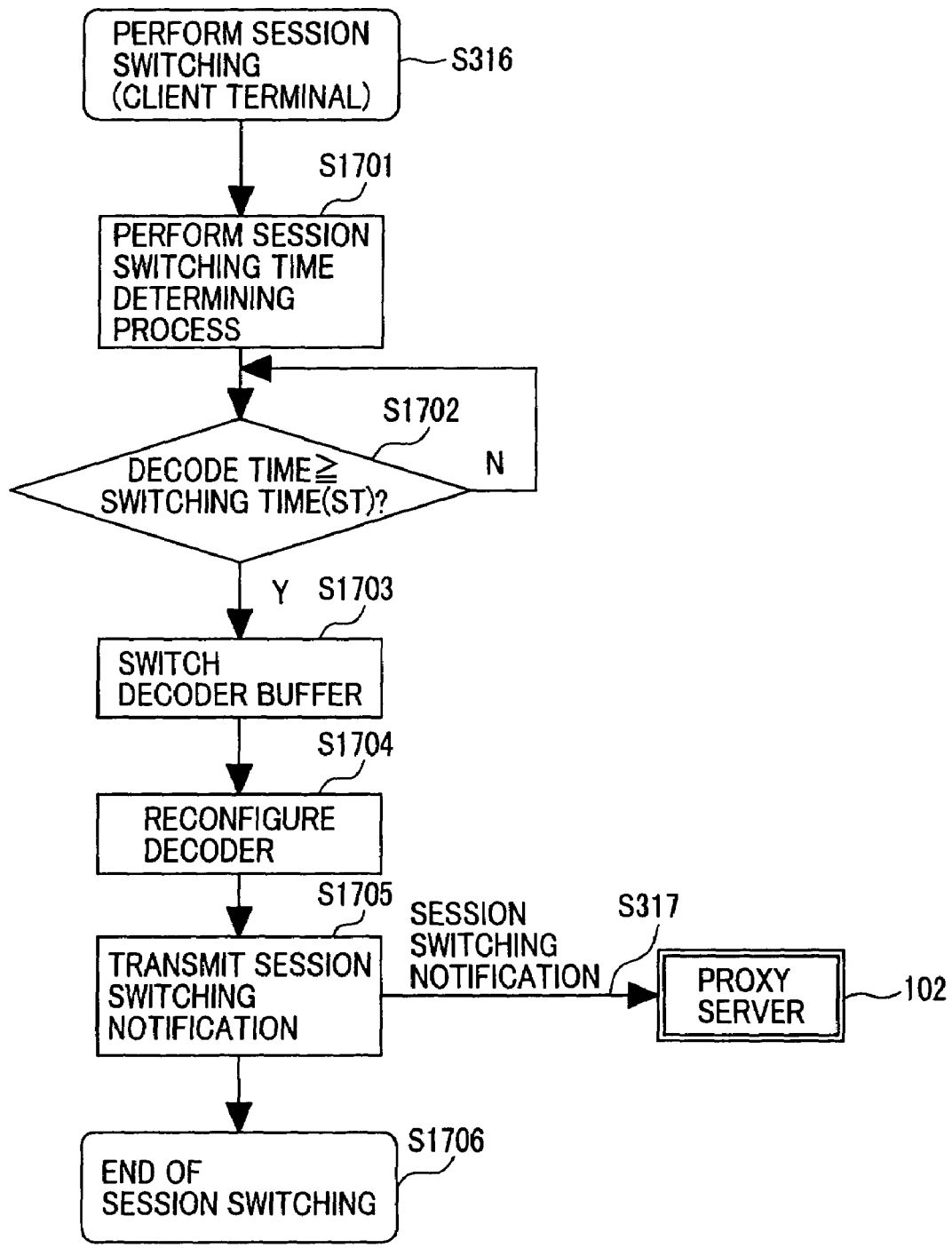
FIG. 17 is a flow chart showing an example of a session switching process at the client terminal in the content delivery system according to Embodiment 1.

In this state, the session switching judging unit 1505 executes the session switching time determining step S1701 (see FIG. 17). The content time ST at which the session is switched (i.e., the decode buffer is switched) is determined by the session switching time determining step S1701, which will be described later in greater detail.

If the decode time of the content data 123 is less than the foregoing switching time ST (S1702), the decoding of the content data 123 is executed continuously. If the decode time of the content data 123 becomes the foregoing switching time ST or more (S1702), the decode buffer switching unit 1510 switches the decode buffer to which the decoder 1511 performs decoding from the decode buffer #1 (1508) to the decode buffer #2 (1509) (S1703). An instruction to switch from the decode buffer #1 to the decode buffer #2 is given under the session switching request (S314) received from the proxy server 102.

Next, in the session switching process S316, the reconfiguration of the decoder 1511 is performed (S1704) If the decoder to be reconfigured is, e.g., a video decoder, the decoder reconfiguring step is performed through reconfiguration of information on decoder initialization including image size and the like in accordance with the new content data 125.

After the switching of the foregoing decode buffer (S1703) and the reconfiguration of the decoder (S1704) described above are ended, the client terminal 119 transmits a session switching notification S317 to the proxy server 102 (S1705) and ends the session switching process S316 (S1706). The right to end the content delivery is dependent on the communication protocol. In the case of using a protocol with which the transmitter checks whether or not the receiver succeeded in receiving a data transmitted therefrom and then sends a next data, such as the TCP, if an ending step is performed on one side, the communication is automatically ended on the other side. In the case of using a protocol with which the transmitter continues transmission irrespective of whether or not the receiver succeeded in reception, such as the UDP, an ending step should be performed on both sides.

Figure 18:
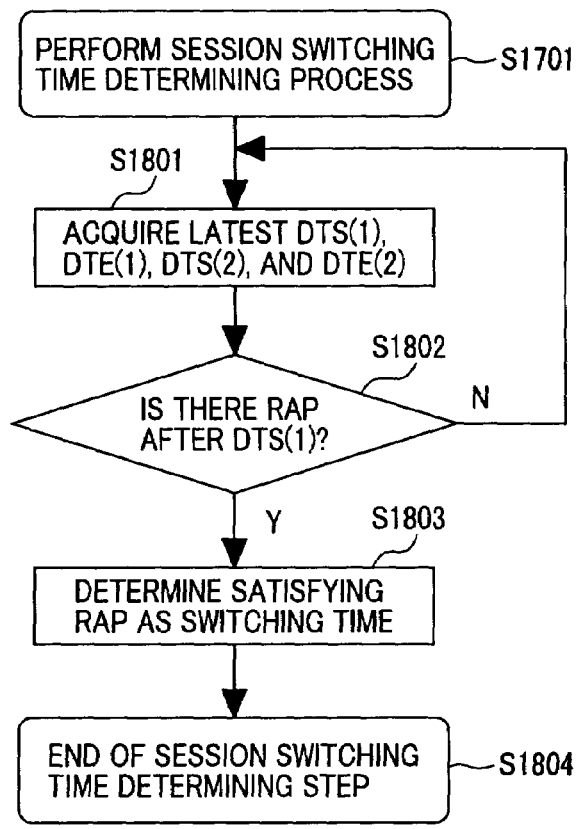
FIG. 18 is a flow chart showing an example of a session switching time determining process at the client terminal in the content delivery system according to Embodiment 1.

A detailed description will be given next to the session switching time determining step S1701 in the session switching process S316 with reference to FIGS. 18 and 19.

In the session management table 1504 at the client terminal 119, the ranges of the content times of the received content data stored in the decode buffers #1 (1508) and #2 (1509) are described, as shown in FIG. 6, and constantly updated. The minimum and maximum content times in the content data in the decode buffer #1 are denoted herein by DTS (1) and DTE (1), respectively, while the minimum and maximum content times in the content data in the decode buffer #2 are denoted herein by DTS (2) and DTE (2), respectively.

In the session switching time determining step S1701, the latest DTS (1), DTE (1), DTS (2), and DTE (2) are acquired from the session management table 1504 (S1801).

In the content data in the decode buffer #2, the content time not less than DTS (1) and at the random access position RAP is retrieved (S1802). Step S1801 described above is repeated until such a RAP appears in the decode buffer #2.

When the RAP satisfying the condition in S1802 is retrieved, the time is determined as the session switching time ST described above (S1803) and the session switching time determining step S1701 is ended (S1804).

Figure 19:
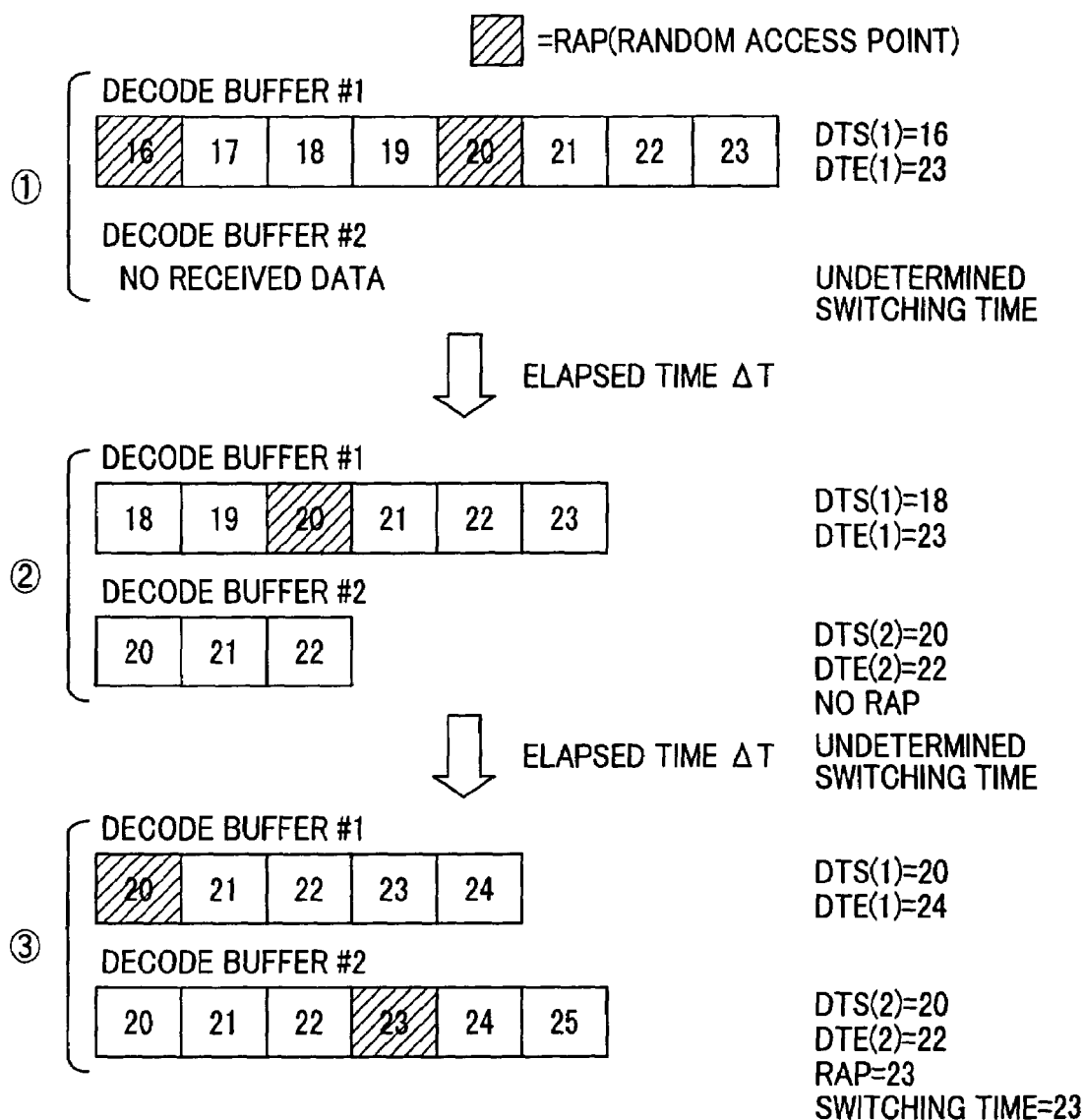
FIG. 19 is a view showing a detailed example of the session switching time determining process at the client terminal in the content delivery system according to Embodiment 1.

FIG. 19 is a schematic diagram showing the session switching judging step S1701 described with reference to FIG. 18 in an easily understandable manner.

In the state (1) in FIG. 19, media data at the content times 16 to 23 are stored in the decode buffer #1. In the decode buffer #2, media data does not exist. In the state (1), therefore, a satisfying RAP does not exist in Step S1802 in FIG. 18 so that Step S1801 is executed again.

In the state (2) in FIG. 19, media data at the content times 18 to 23 are stored in the decode buffer #1. Media data at the content times 20 to 22 are stored in the decode buffer #2 but a RAP does not exist thereamong. In the state (2), therefore, a satisfying RAP does not exist in Step S1802 in FIG. 18 so that Step S1801 is executed again. In the state (3) in FIG. 19, media data at the content times 20 to 25 are stored in the decode buffer #1. Media data at the content times 20 to 24 are stored in the decode buffer #2 and a RAP=23 larger than DTS (1)=20 exists thereamong. In the state (3), the satisfying RAP=23 exists in Step S1802 in FIG. 18 so that Step S1803 is executed and the session switching time=23 is determined. In other words, the decoder 1511 decodes the media data in the decoder buffer #1 immediately before the content time of 23 and decodes the media data in the decode buffer #2 at 23 and thereafter.

In FIG. 3, after the session switching process S320 is activated, the session switching S316 and the old session S318 are completed at the client terminal 119, and the session switching process S320 is ended at the proxy server 102 as described above, a normal delivery state according to the foregoing session managing process S312, which has been already activated, is restored. That is, the state in which the reception of a content from the delivery server 100 (S800), the transmission of the content to the client terminal 119 (S801), the management of the current situation at the client terminal 119 (S802), and the monitoring of the throughput of each of the communication paths (S803) are performed continuously is restored.

Thus, in the multimedia communication system according to Embodiment 1, the sessions for delivering two contents each encoded from the same source data and having different attributes, such as bit rates, are established simultaneously between the proxy server and the client terminal upon the switching of the communication path. The client terminal acquires the respective content times of the two content data received in these sessions and performs switching with a timing determined to minimize the occurrence of an interruption. In contrast to the conventional method for continuing the delivery service on the switching of the communication path in which the delivery service is interrupted temporarily, the present embodiment minimizes the occurrence of a temporary interruption and thereby allows the delivery service to be continued. Since a content with a bit rate suited to the communication path after switching is delivered upon the switching of the connection path, it is possible to continue the service of delivering the content encoded from the same source data even if the throughput of the communication path after switching is different from the throughput of the communication path before switching.

Embodiment 2 of the present invention as a variation of Embodiment 1 is a content delivery system in which the client terminal 119 is also provided with the function of the proxy server 102.

Figure 20:
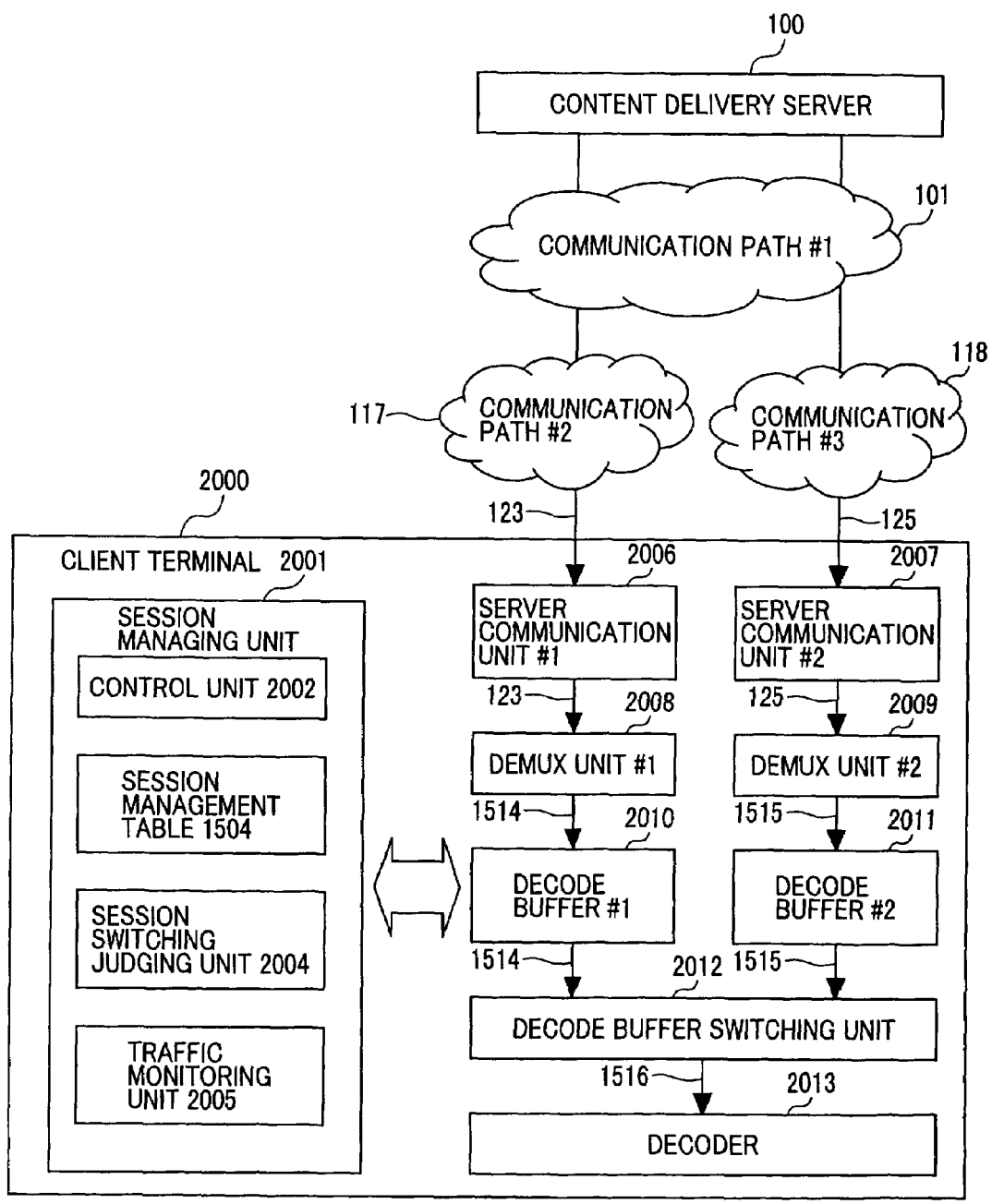
FIG. 20 is a block diagram showing an exemplary structure of a client terminal in a content delivery system according to Embodiment 2 of the present invention.

FIG. 20 shows a structure of a client terminal 2000 according to Embodiment 2. Server communication units 2006 and 2007 are portions for performing data transmission/reception to and from the delivery server 100 via the communication paths #2 (117) and #3 (118). Demux portions 2008 and 2009, decode buffers 2010 and 2011, a decode buffer switching unit 2012, and a decoder 2013 are the same as in the structure (FIG. 15) of the client terminal 119 according to Embodiment 1. A session managing unit 2001 is composed of a control unit 2002, the session management table 1504, a session switching judging unit 2004, and a traffic monitoring unit 2005.

Figure 21:
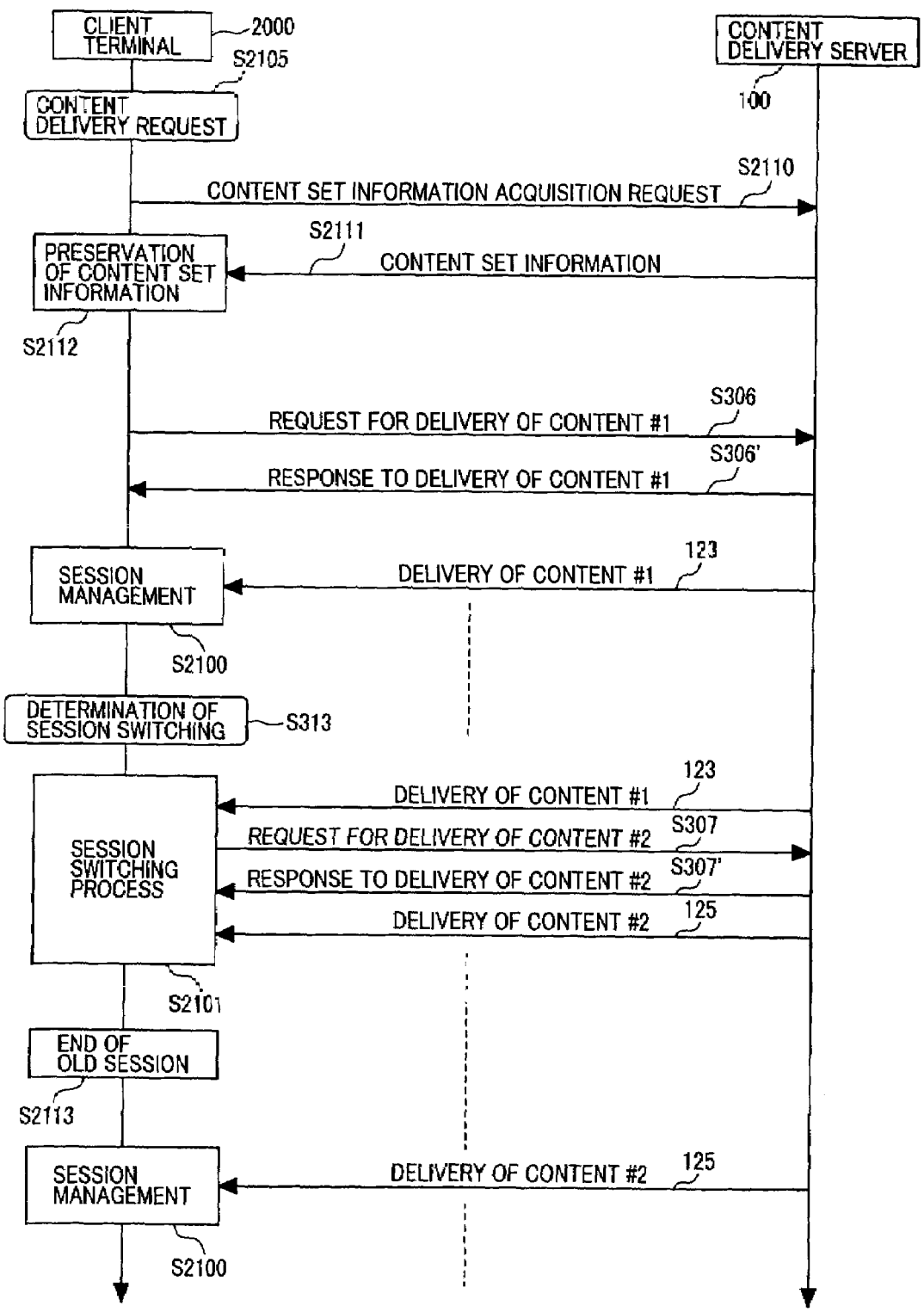
FIG. 21 is a view showing an example of a processing flow in the content delivery system according to Embodiment 2.

A process flow at the client terminal 2000 and at the delivery server 100 is shown in FIG. 21.

If a content delivery request event occurs at the client terminal 2000 under an instruction from the user or the like in FIG. 21 (S2105), the client terminal 2000 transmits the content set information acquisition request 401 to the delivery server 100 (S2110). An example of the content set information acquisition request is the same as described above (FIG. 4). Upon receipt of the content set acquisition request 401, the delivery server 100 transmits the requested content set information 402 to the client terminal 2000 (S2111). An example of the content set information is the same as described above (FIG. 4).

When the client terminal 200 receives the aforementioned content set information 402 in FIG. 21 (S2111), the client terminal 2000 stores the information in the session management table 1504 (S2112). The session management table 1504 at the client terminal 2000 is the same as the session management table 1504 at the client terminal 119 according to Embodiment 1.

In FIG. 21, the client terminal 2000 selects, from the received content set information 402, an URL for one content based on, e.g., a directive operation by the user or the throughput situation on the communication path currently established at the terminal and transmits a content delivery request to the delivery server 100 (S306). Upon receipt of the content delivery request, the delivery server 100 transmits a response to the content delivery request to the client terminal 2000 (S306'). In the flow of the content delivery system according to Embodiment 1 shown in FIG. 3, a plurality of content delivery requests have been transmitted to the delivery server in the content delivery requesting step S308 described above. In Embodiment 2 also, the delivery of a plurality of contents can be requested in the same manner as in Step S308 according to Embodiment 1. In the example of FIG. 21, however, it is assumed that only one content delivery request S306 is transmitted.

Thereafter, the delivery server 100 initiates the delivery of a content data #1 (123) responding to the content delivery request (S306) to the client terminal 2000. The client terminal 2000 activates a session managing process S2100. An example of the format of the content data 123 delivered from the delivery server 100 to the client terminal is the same as shown in FIG. 7 according to Embodiment 1.

Figure 22:
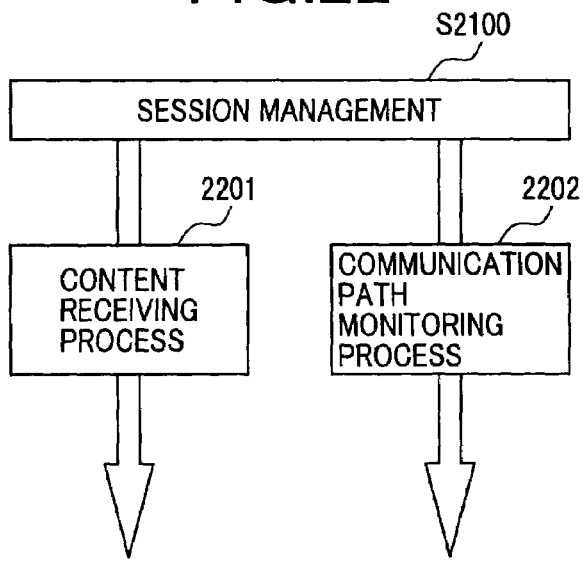
FIG. 22 is a view showing an exemplary structure of a session managing process at the client terminal in the content delivery system according to Embodiment 2.
Figure 23:
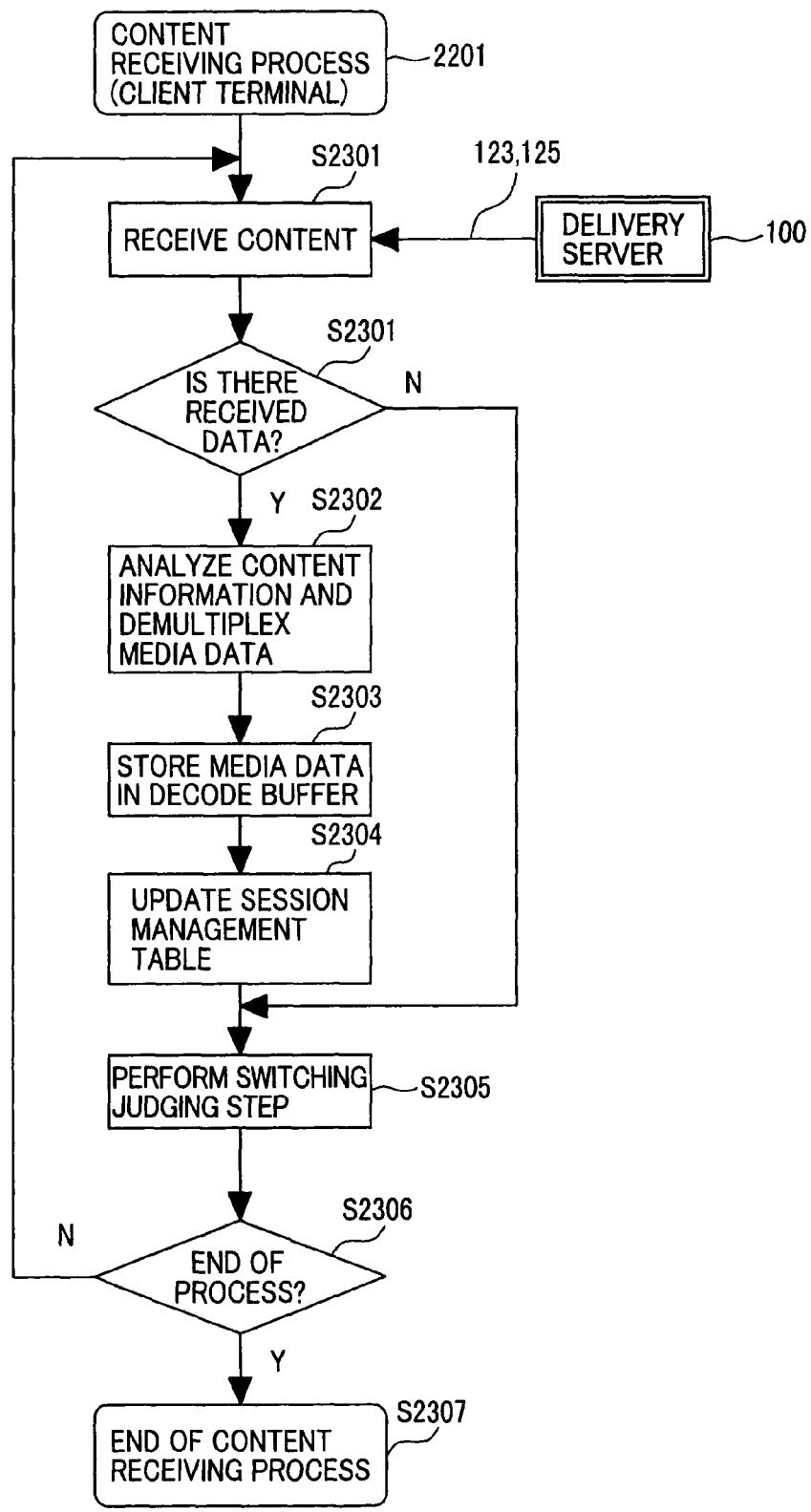
FIG. 23 is a flow chart showing an example of a content receiving process at the client terminal in the content delivery system according to Embodiment 2.

Referring to FIGS. 22 and 23, the foregoing session managing process S2100 at the client terminal 2000 will be described in detail. As shown in FIG. 22, a content receiving process 2201 and a communication path monitoring process 2202 are operating independently in the session managing process S2100. The following is the detailed description of the individual processes.

A detailed description will be given to the content receiving process S2100 at the client terminal 200 with reference to FIG. 23. In the content receiving process S2100, a combination of the content receiving process S309 at the client terminal 119 and the session switching judging step S1102 at the proxy server 102, each according to Embodiment 1, is performed.

In FIG. 23, the server communication unit (2006 or 2007) receives the content data (123 or 125) from the delivery server 100 (S2301). Upon recognition of the presence of the received content data (123 or 125) (S2302) the server communication unit (2006 or 2007) passes the content data to the Demux unit (2008 or 2009). The Demux unit (2008 or 2009) analyzes the header portion (the moov or moof in FIG. 7) of the received content data to acquire the content information, demultiplexes media data (1514 or 1515) in the received content data therefrom (S2302), stores the media data in the decode buffer (2010 or 2011) (S2303) and preserves the acquired content information in the session management table 1504 (S2304). In Step S2305, the step of judging the switching of the communication path is performed. The communication path switching judging step S2305 is the same as the communication path switching judging step S1102 at the proxy server 102 according to Embodiment 1. The content receiving process 2201 repeatedly performs the foregoing process. If an instruction to end the process is given from the control unit 2002 (S2306), the content receiving process 2201 is ended (S2307).

In the communication path monitoring process 2202 in FIG. 22, dummy data of a specified size is received periodically from the delivery server 100 via a communication path (which is the communication path #3 in the example of FIG. 21) other than the communication path (which is the communication path #2 in the example of FIG. 21) on which the content delivery session is currently established. The current throughput of the communication path #3 and the history thereof are constantly monitored by measuring the reception throughput and recording the measured reception throughput in the session management table 1504. The communication path monitoring process 2202 is executed for the purpose of selecting a content requested on switching from the current communication path to another communication path, similarly to the communication path monitoring process 803 according to Embodiment 1.

The detailed description will be given to the communication path switching determining event S313 and the process flow subsequent thereto in FIG. 21.

The session switching determining event S313 in FIG. 21 is caused by either of the following factors: (1) The switching of the session is requested by a directive operation by the user at the client terminal 2000; and (2) The switching of the communication path is determined in the switching judging step S2305 in the foregoing content receiving process 2201 at the client terminal 200. Thus, Embodiment 2 is different from Embodiment 1 in that the switching of the communication path is determined at the client terminal 2000 in each of the foregoing factors (1) and (2).

Figure 24:
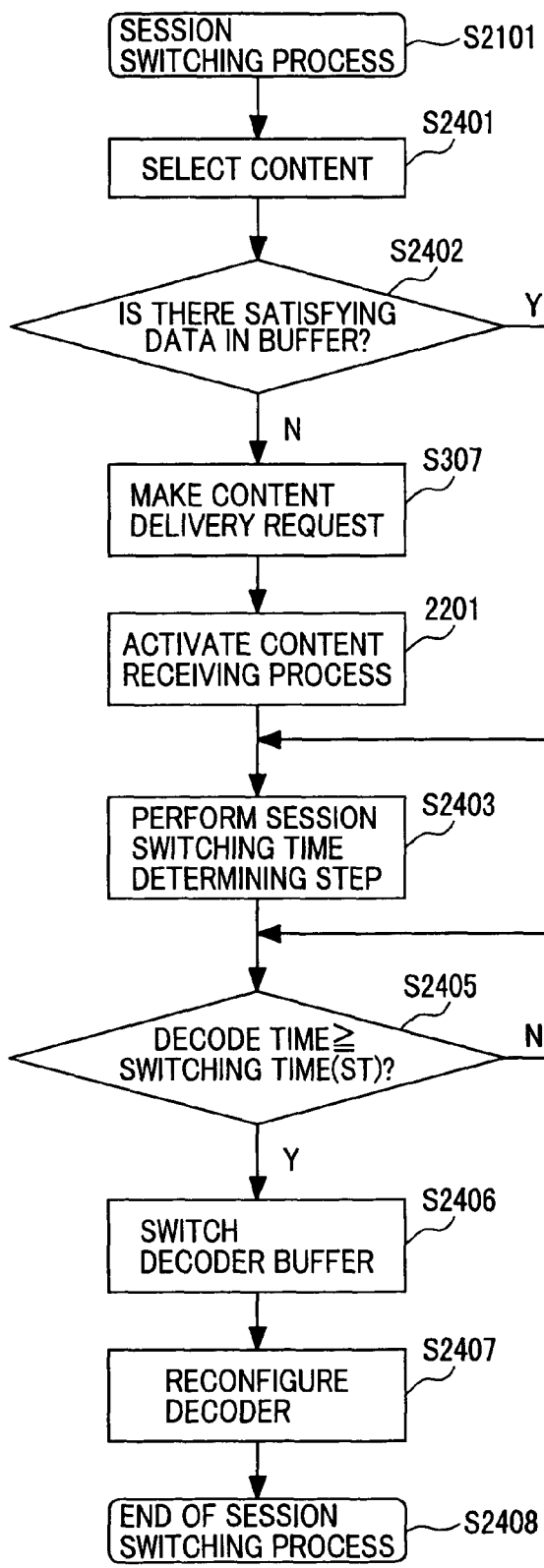
FIG. 24 is flow chart showing an example of a session switching process at the client terminal in the content delivery system according to Embodiment 2.

When the session switching determining event S313 occurs in FIG. 21, the control unit 2002 at the client terminal 2000 executes the session switching process S2101. The session switching process S2101 performs the combined functions of the session switching process S320 at the proxy server 102 and the session switching process S316 at the client terminal 119, each according to Embodiment 1. A detailed description will be given to the session switching process S2101 with reference to FIG. 24.

The session switching process S2101 acquires the throughput of the communication path after switching and the content set information from the session management table 1504. By retrieving, in the content set information, a content having the highest average bit rate not more than the throughput of the communication path after switching, the content to be delivered in a new session is selected. In addition, the time ETS of the latest content received already at the client terminal 2000 in the current session is acquired (S2401).

Next, in the session switching process S2101, it is checked that the content data selected in Step S2401 (in the present description, it is assumed that the content data #2 (125) has been selected) has already been received from the delivery server 100 and whether or not the media data (1514 or 1515) corresponding to the content time ETS acquired in Step S2401 is present in the decode buffer (2010 or 2011) (S2402). If the media data is not present, the request for the delivery of the content data set #2 (specifying data at the content time ETS and thereafter) is transmitted to the delivery server 100 (S307 in FIG. 21) and then a response to the delivery request from the delivery server 100 is received (S307'). Thereafter, the content receiving process (2201) described above is activated to start the reception of the content data #2 (125).

Next, in the session switching process S2101, a session switching time determining step S2403 is executed so that the content time ST at which the session is switched is determined. What is performed in the session switching time determining process S2403 is the same as in the session switching time determining step S1701 (FIG. 18) at the client terminal 119 according to Embodiment 1.

If the decode time of the media data #1 (1514) is less than the foregoing switching time ST (S2405), the decoding of the media data #1 (1514) is executed continuously.

If the decode time of the media data #1 (1514) becomes the foregoing switching time ST or more (S2405), the decode buffer switching unit 2012 switches the decode buffer to which the decoder 2013 performs decoding from the decode buffer #1 (2010) to the decode buffer #2 (2011) (S2406).

Then, in the session switching process S2101, the decoder 2013 is reconfigured (S2407). The decoder reconfiguring step S2407 is the same as the decoder reconfiguring step S1704 according to Embodiment 1. Thereafter, the session switching process S2101 is ended (S2408).

When the session switching process S2101 is thus completed in FIG. 21, the old delivery session prior to switching is ended at the client terminal 2000 (S2113). Thereafter, a normal state in which the content data #2 (125) is received according to the foregoing session managing process S2100 is restored.

Thus, in the multimedia communication system according to Embodiment 2, the sessions for delivering two contents each encoded from the same source data and having different attributes, such as bit rates, are established simultaneously between the client terminal and the delivery server upon the switching of the communication path. The client terminal acquires the respective content times of the two content data sets received in these sessions and performs switching with a timing determined to minimize the occurrence of an interruption. In contrast to the conventional method for continuing the delivery service on the switching of the communication path in which the delivery service is interrupted temporarily, the present embodiment minimizes the occurrence of a temporary interruption and thereby allows the delivery service to be continued. Since a content with a bit rate suited to the communication path after switching is delivered upon the switching of the communication path, it is possible to continue the service of delivering the content providing the same data material even if the throughput of the communication path after switching is different from the throughput of the communication path before switching.

Although the present application has disclosed the combination of Wireless LAN shown in FIG. 1 and 1×EV-DO, the present application is also applicable to other mobile communication networks such as W-CDMA and PHS communication networks. As a replacement for Wireless LAN, Bluetooth or UWB (Ultra Wide Band) can be considered.

What is claimed is:

1. A terminal apparatus comprising:
a communication unit that simultaneously establishes two or more communication paths between said communication unit and a content delivery server connected to said communication unit, wherein said communication unit is implemented in hardware;
a session managing unit that manages said two or more communication paths, wherein said session managing unit is implemented in said hardware;
a decoder that decodes content data received from said two or more communication paths,
wherein said decoder is implemented in said hardware,
wherein when said communication unit receives first content data via a first communication path of said two or more communication paths, said session managing unit selects a second communication path from among said two or more communication paths, and transmits a request for a delivery of second content data via said second communication path to said content delivery server, and
wherein after said communication unit receives the first content data from said first communication path and the second content data from said second communication path simultaneously, said session managing unit terminates reception of the first content data via said first communication path, and performs switching between said first communication path and said second communication path;
a first buffer which stores the first content data from said first communication path; and
a second buffer which stores the second content data from said second communication path,
wherein when said communication unit receives the first content data from said first communication path and the second content data from said second communication path simultaneously, said session managing unit determines a content time of the second content data in said second buffer, which is not less than the minimum content time in the first content data in said first buffer, as a session switching time which is a time to switch the first buffer and the second buffer, and
wherein said session managing unit switches the content data received from said two or more communication paths, from the first content data stored in said first buffer to the second content data stored in said second buffer at the session switching time.

2. The terminal apparatus of claim 1, wherein said session managing unit requests, of said content delivery server, establishment of a session over a new communication path based on information on a throughput of the communication path currently under communication and receives the content data received from said two or more communication paths.

3. The terminal apparatus of claim 1, wherein said session managing unit has a session management table for managing information on a content time of the content data currently received over said two or more communication paths over which said content data is received and on a decode time of the content data currently decoded and reduces a discontinuous time during content data playback upon the switching between said first communication path and said second communication path.

4. The terminal apparatus of claim 1, wherein said session managing unit transmits, based on data sent from said content delivery server, information on each of said communication paths including at least one of a content time of the content data received over said two or more communication paths within a specified period of time at the terminal, an amount of data remaining in a buffer at the terminal, and a packet loss rate within a specified range to said delivery server via said communication unit.

5. The terminal apparatus of claim 1, further comprising:
an input unit for receiving an input from a user, said terminal apparatus establishing, in response to an instruction given from the user via the input unit, a session over a new communication path in addition to the communication path currently under communication and initiating reception from said two or more communication paths.

* * * * *